US010625255B2

(12) United States Patent
Tajima

(10) Patent No.: US 10,625,255 B2
(45) Date of Patent: Apr. 21, 2020

(54) SOFT STOPPER PENETRATING DISPENSING DEVICE AND SOFT STOPPER PENETRATING DISPENSING METHOD

(71) Applicant: Universal Bio Research Co., Ltd., Matsudo-shi, Chiba (JP)

(72) Inventor: Hideji Tajima, Matsudo (JP)

(73) Assignee: Universal Bio Research Co., Ltd. (JP)

( * ) Notice: Subject to any disclaimer, the term of this patent is extended or adjusted under 35 U.S.C. 154(b) by 241 days.

(21) Appl. No.: 15/111,709

(22) PCT Filed: Jan. 16, 2015

(86) PCT No.: PCT/JP2015/051143
§ 371 (c)(1),
(2) Date: Jul. 14, 2016

(87) PCT Pub. No.: WO2015/108164
PCT Pub. Date: Jul. 23, 2015

(65) Prior Publication Data
US 2016/0332156 A1    Nov. 17, 2016

(30) Foreign Application Priority Data

Jan. 16, 2014 (JP) .................. 2014-006243

(51) Int. Cl.
*B01L 3/02* (2006.01)
*G01N 35/10* (2006.01)

(52) U.S. Cl.
CPC ........ *B01L 3/0275* (2013.01); *G01N 35/1079* (2013.01); *B01L 2300/0672* (2013.01);
(Continued)

(58) Field of Classification Search
USPC .............. 422/511–512, 509; 73/863.74
See application file for complete search history.

(56) References Cited

U.S. PATENT DOCUMENTS 3,869,068 A  *  3/1975  Chen .................. G01N 1/38
                                                    141/25
4,951,512 A      8/1990  Mazza et al.
(Continued)

FOREIGN PATENT DOCUMENTS

JP        1933733 Y      10/1988
JP     2000-97950 A       4/2000
(Continued)

OTHER PUBLICATIONS

English Translation of International Search Report in Int'l Application No. PCT/JP2015/051143, dated Apr. 21, 2015, 2 pages.
(Continued)

*Primary Examiner* — Brian R Gordon
(74) *Attorney, Agent, or Firm* — Andrus Intellectual Property Law, LLP

(57) ABSTRACT

The present invention relates to a soft stopper penetrating dispensing device and a soft stopper penetrating dispensing method. A purpose of the present invention is to suction and discharge liquid with respect to a soft stopper sealed container sealed with a soft stopper such as a rubber stopper without removing the soft stopper. The soft stopper penetrating dispensing device includes a dispensation available punching head which is provided to be relatively movable relative to a stage where the soft stopper sealed container sealed with the soft stopper is able to be placed, a punching tip which has a through-hole along the vertical direction and is made of a hard material and formed in a tapered shape, a dispensing needle tip which is movably provided relative to the head by the dispensing moving mechanism provided in the dispensation available punching head and is able to suction and discharge the liquid.

16 Claims, 13 Drawing Sheets

(52) U.S. Cl.
CPC ............... *B01L 2300/0854* (2013.01); *B01L 2400/0478* (2013.01); *G01N 2035/103* (2013.01); *G01N 2035/1051* (2013.01)

(56) References Cited

U.S. PATENT DOCUMENTS

| | | | | |
|---|---|---|---|---|
| 5,240,679 | A * | 8/1993 | Stettler | G01N 35/1079 422/562 |
| 2011/0076668 | A1 | 3/2011 | Oguro | |
| 2011/0091988 | A1 | 4/2011 | Itoh | |

FOREIGN PATENT DOCUMENTS

| | | |
|---|---|---|
| JP | 2007-159464 A | 12/2005 |
| JP | 2010-78335 A | 4/2010 |
| JP | 2011-107120 | 6/2011 |
| JP | 2012-21871 A | 2/2012 |
| JP | 2013-104769 A | 5/2013 |
| JP | 2013-185912 A | 9/2013 |

OTHER PUBLICATIONS

First Written Opinion in Int'l Application No. PCT/JP2015/051143, dated Apr. 21, 2015, 6 pages.
Second Written Opinion in Int'l Application No. PCT/JP2015/051143, dated Feb. 16, 2016, 4 pages.
International Preliminary Report on Patentability in Int'l Application No. PCT/JP2015/051143, dated May 24, 2016, 4 pages.

* cited by examiner

[Fig. 1]
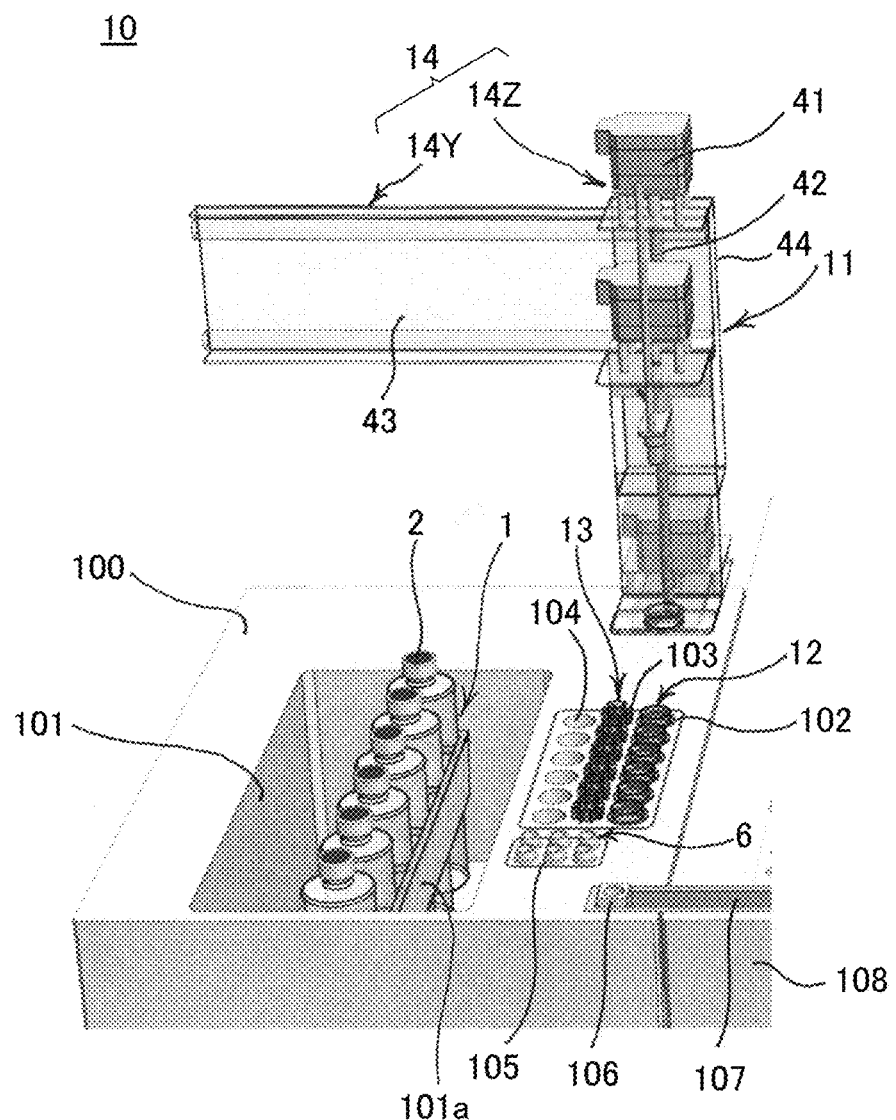

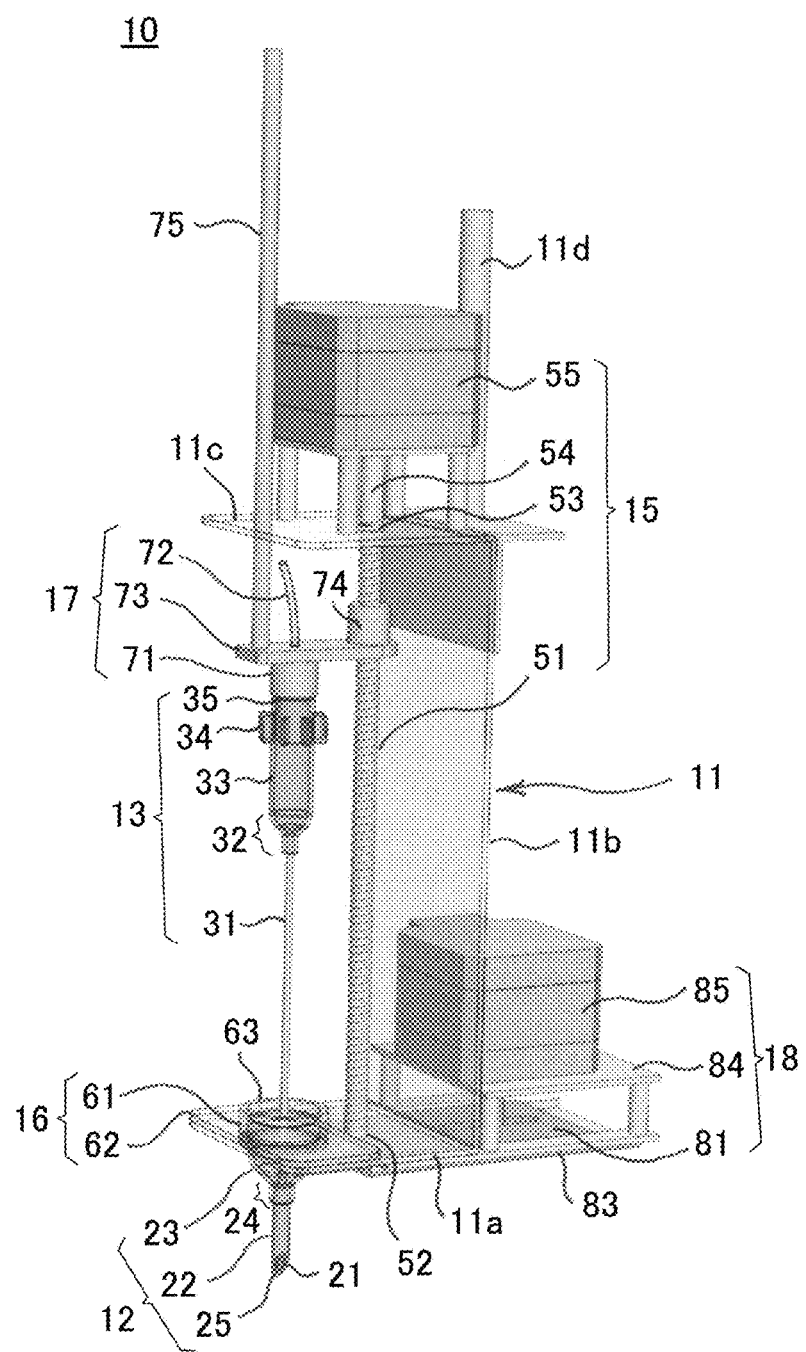
[Fig. 2]

[Fig. 3]
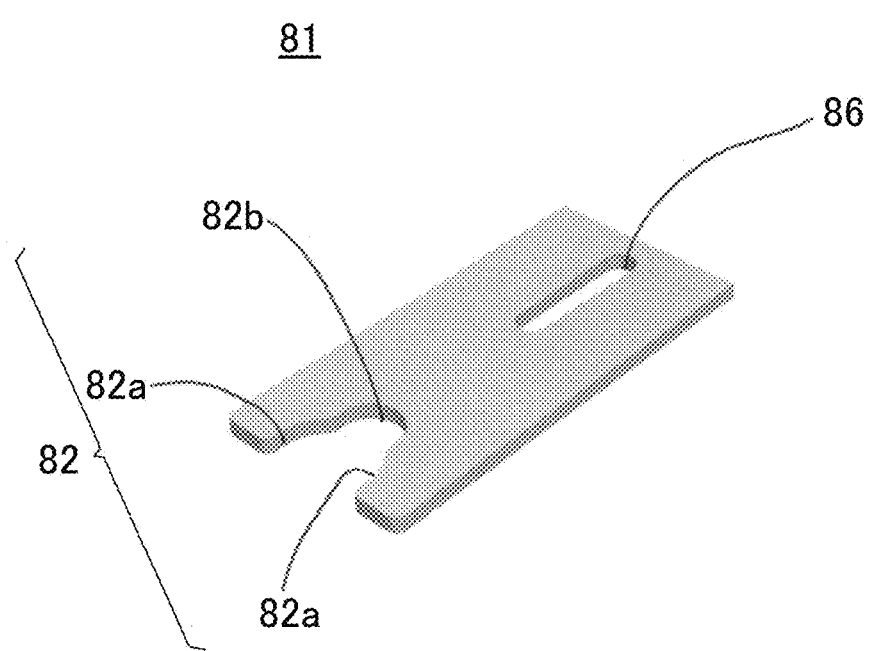

[Fig. 4]
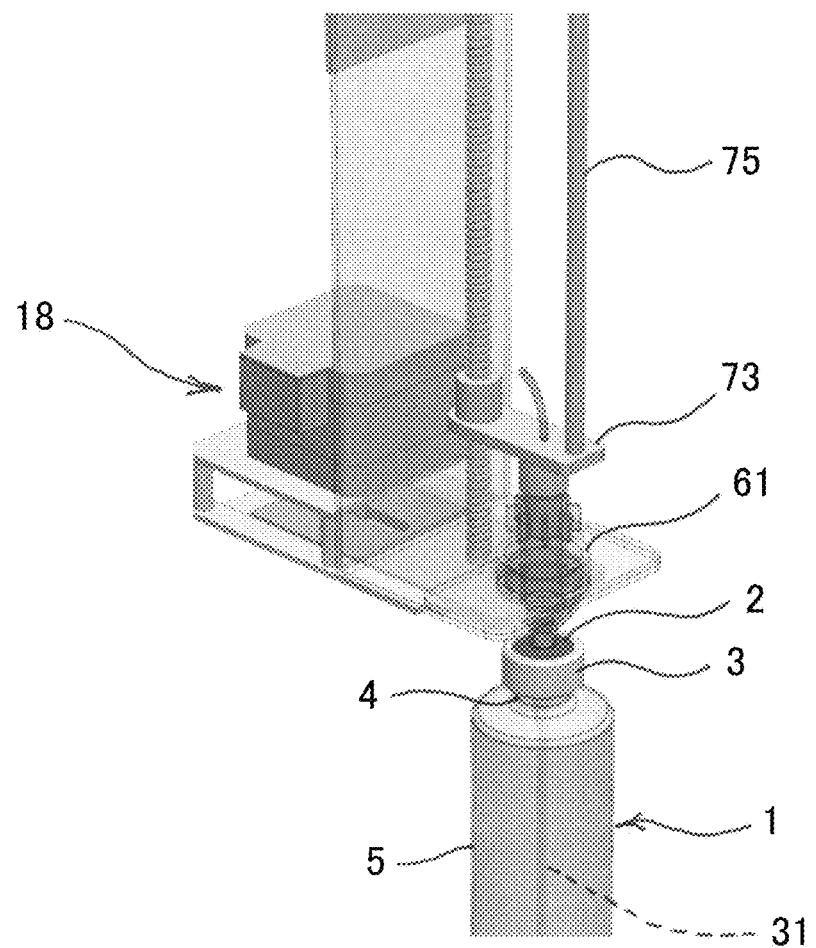

[Fig. 5]
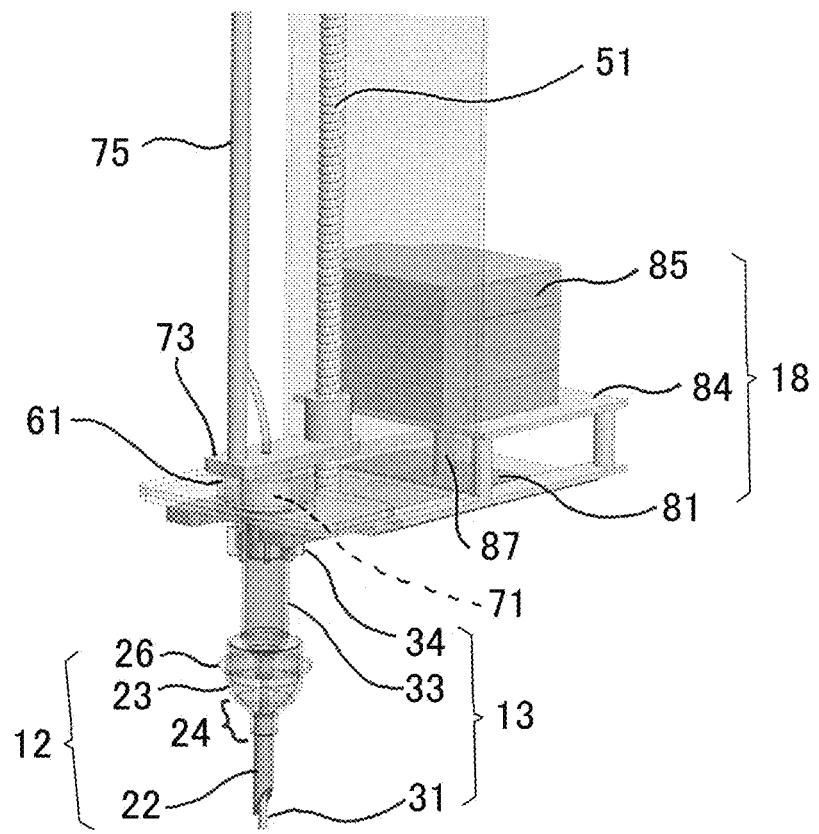

[Fig. 6]
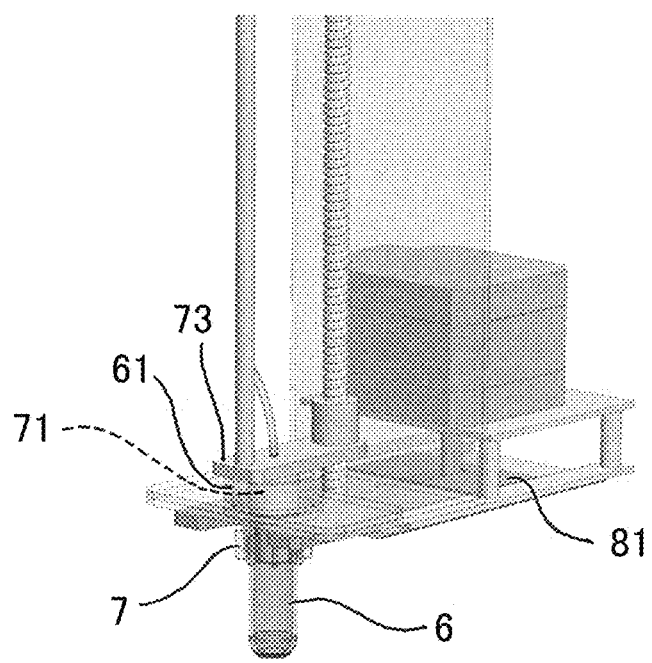

[Fig. 7]
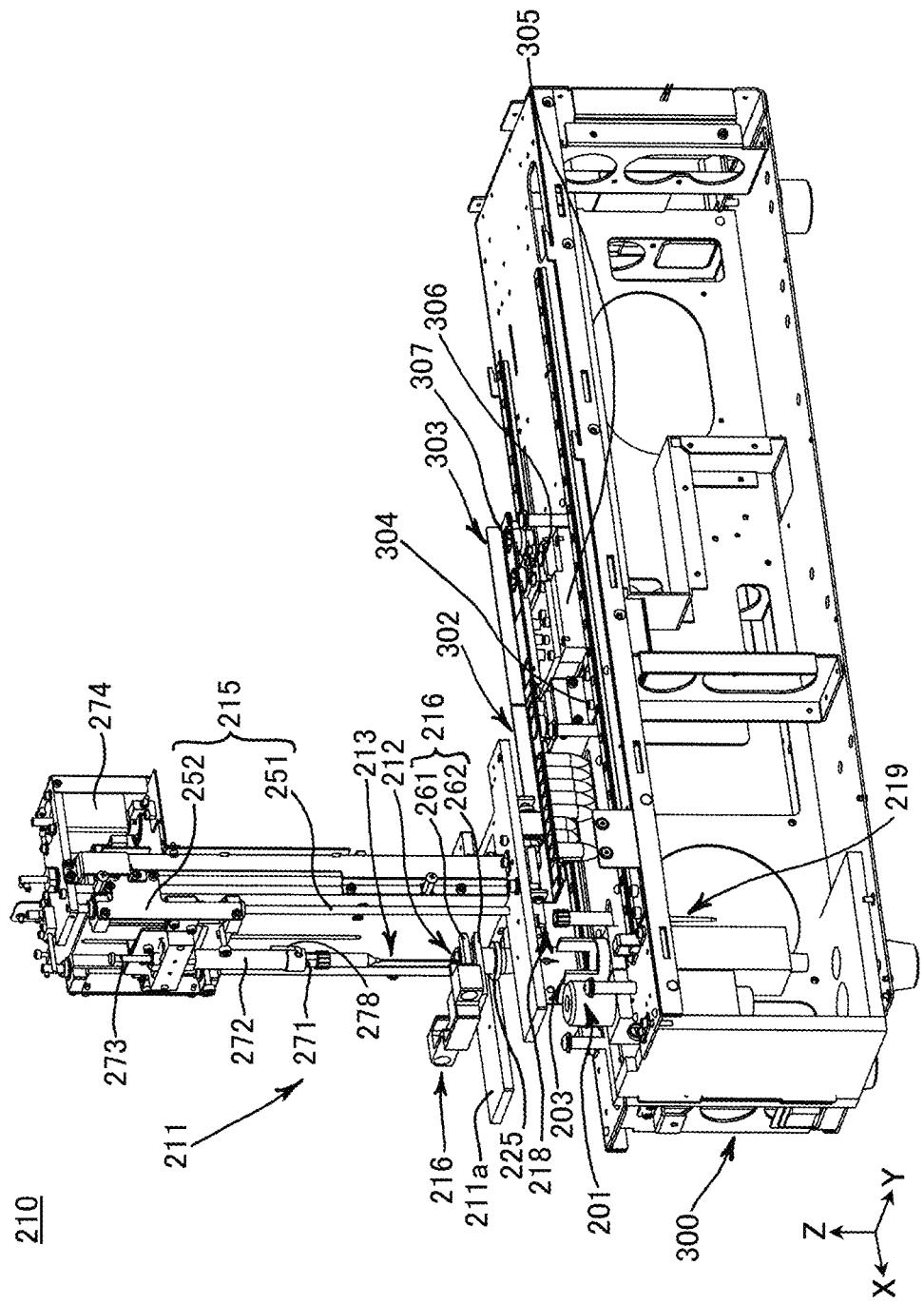

【Fig. 8】
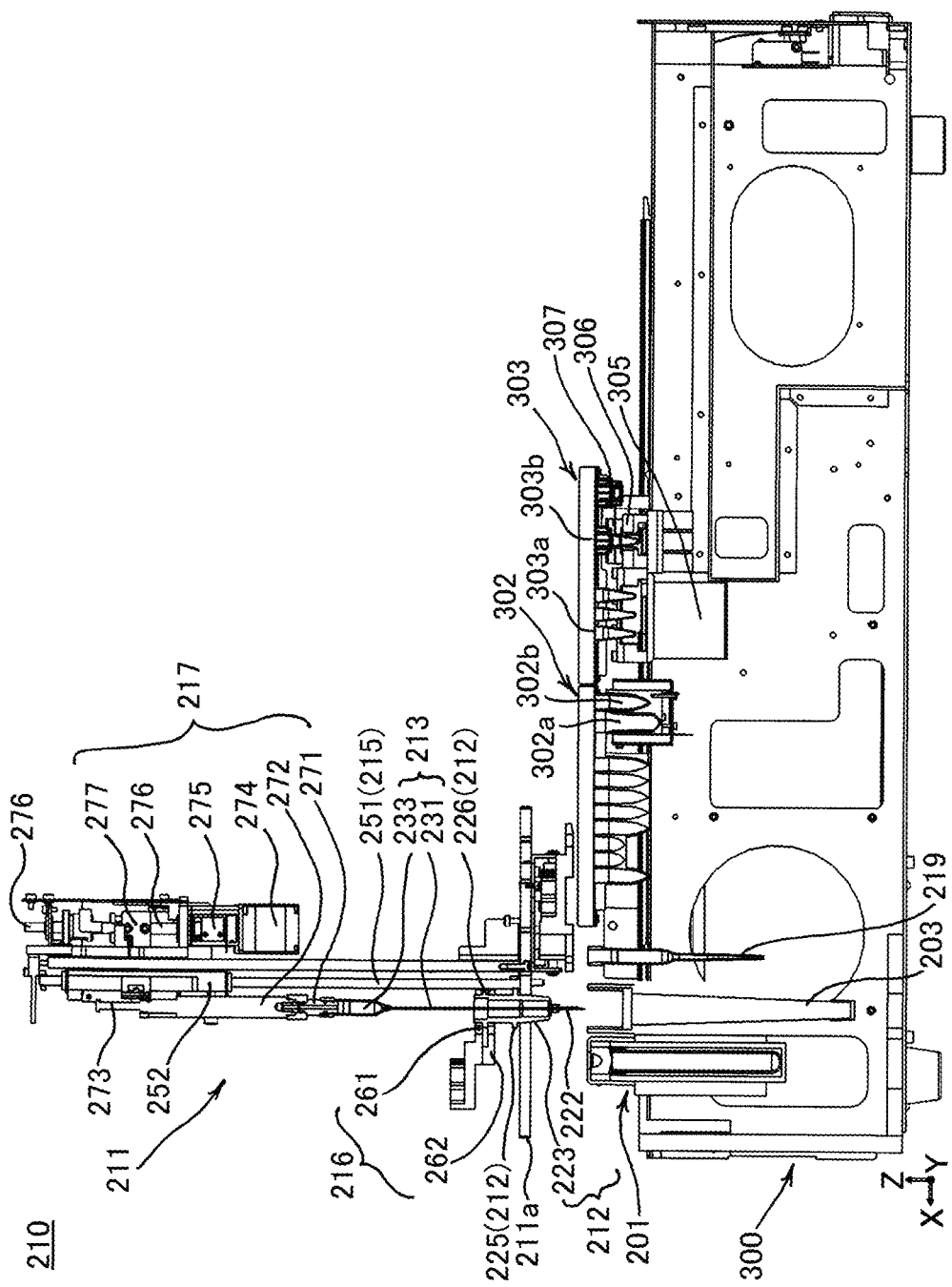

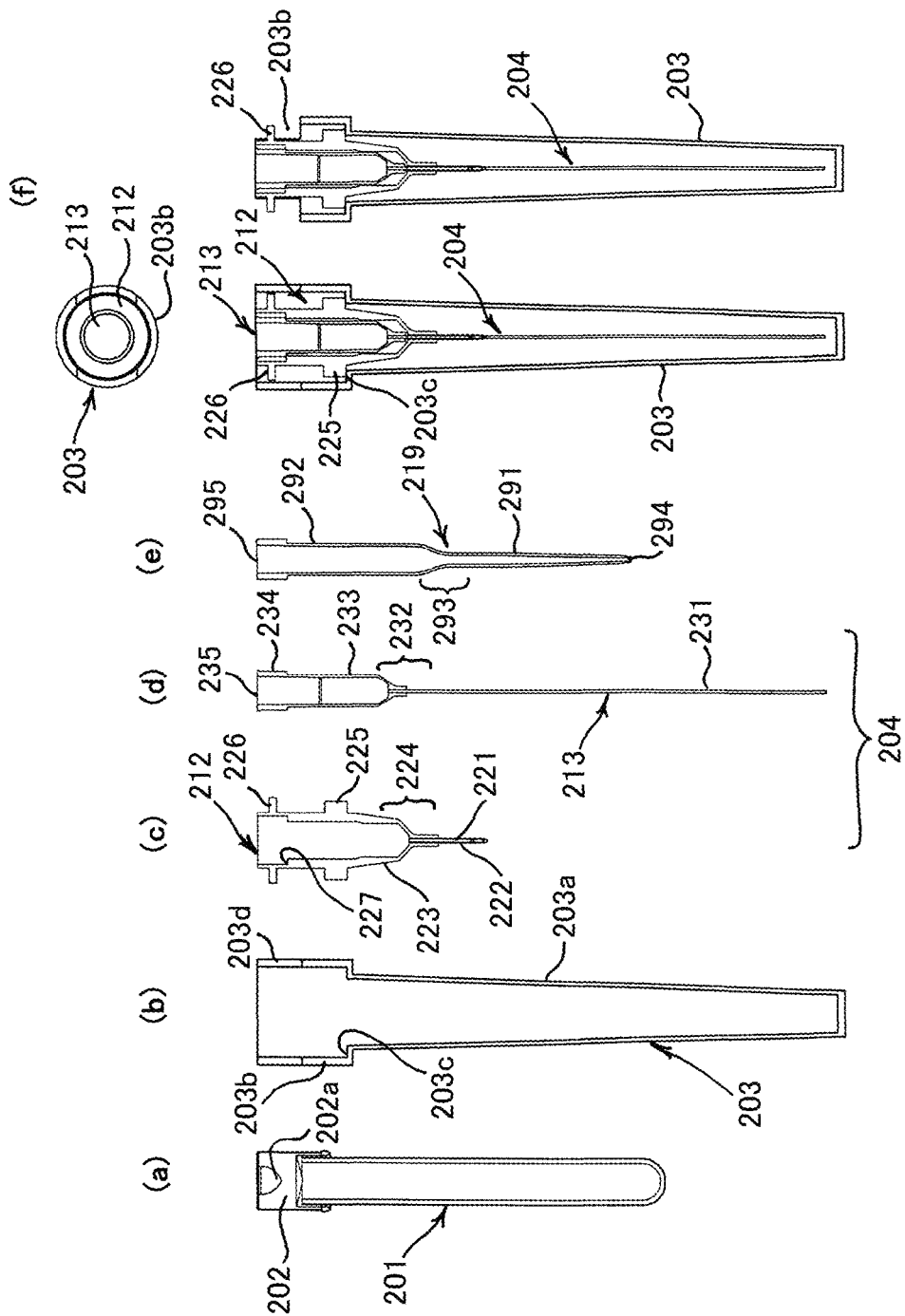
[Fig. 9]

[Fig. 10]
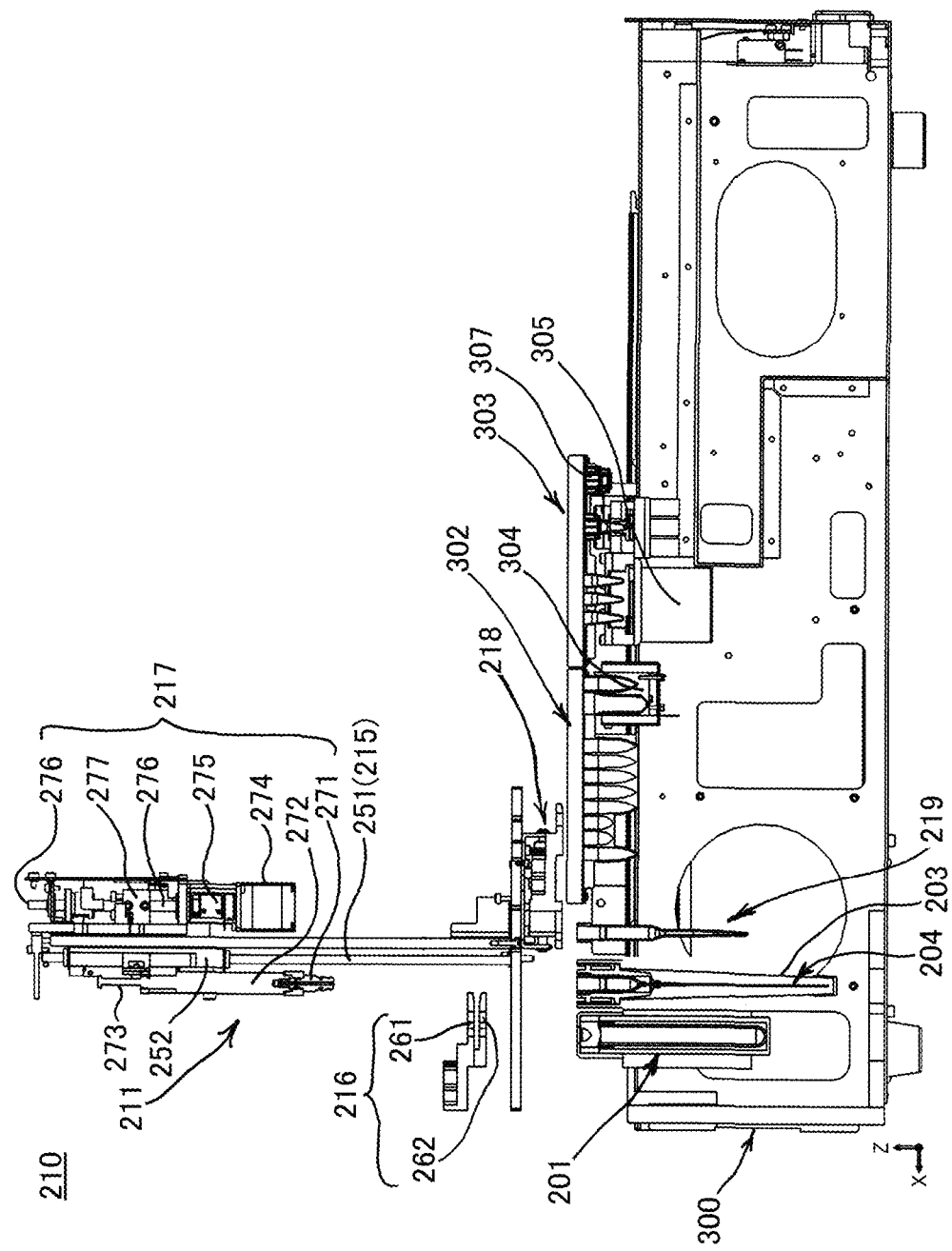

[Fig. 11]
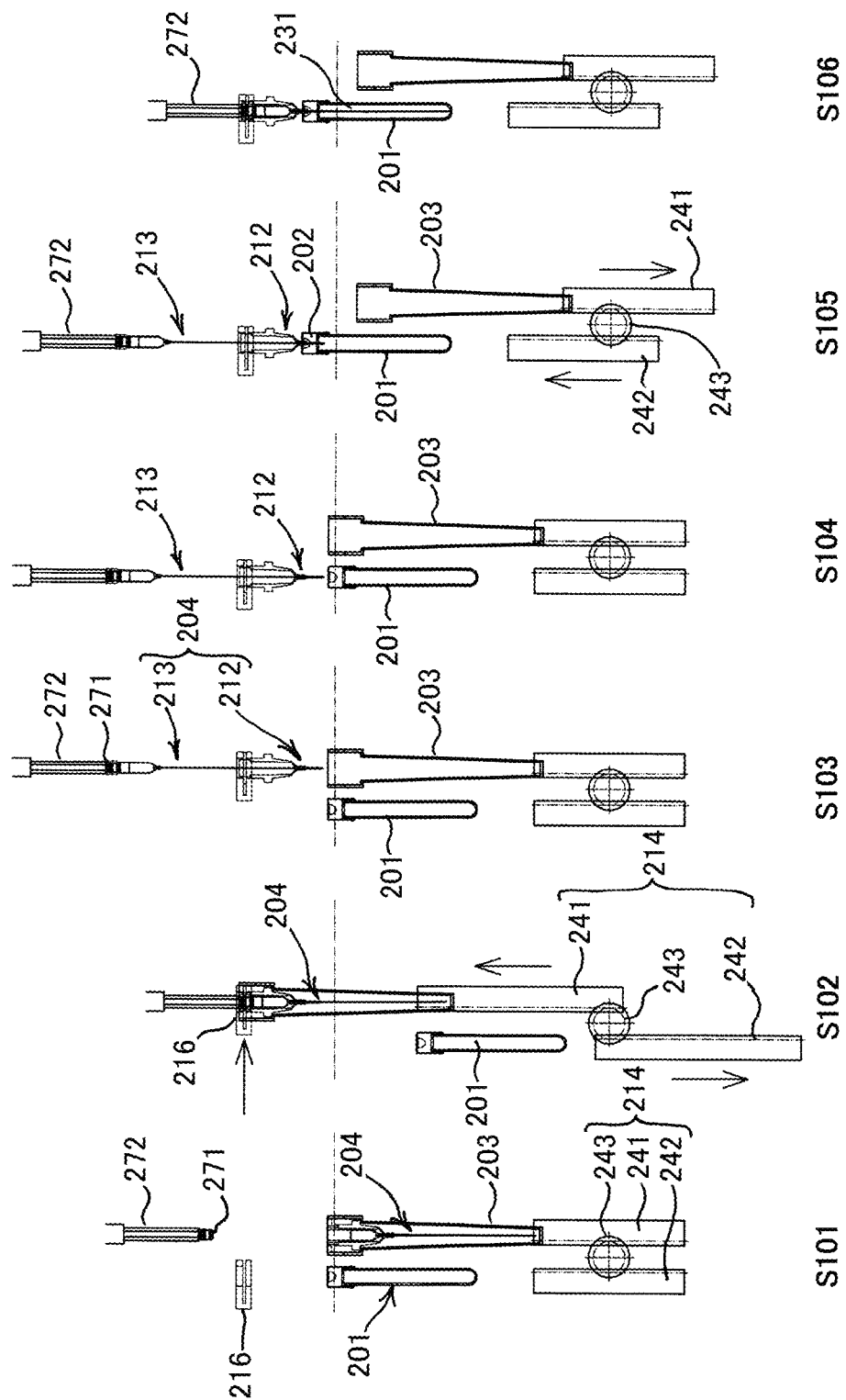

[Fig. 12]
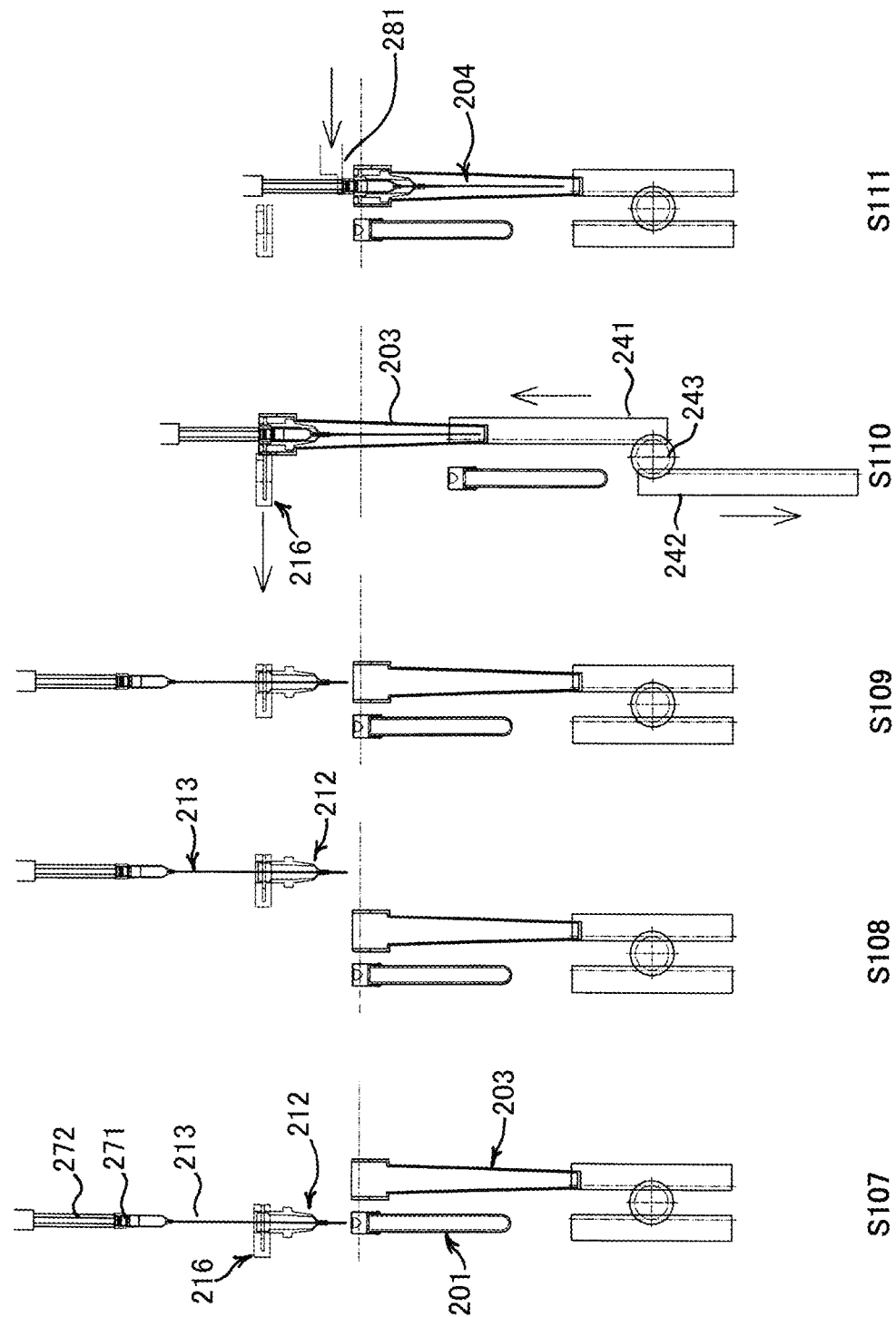

[Fig. 13]
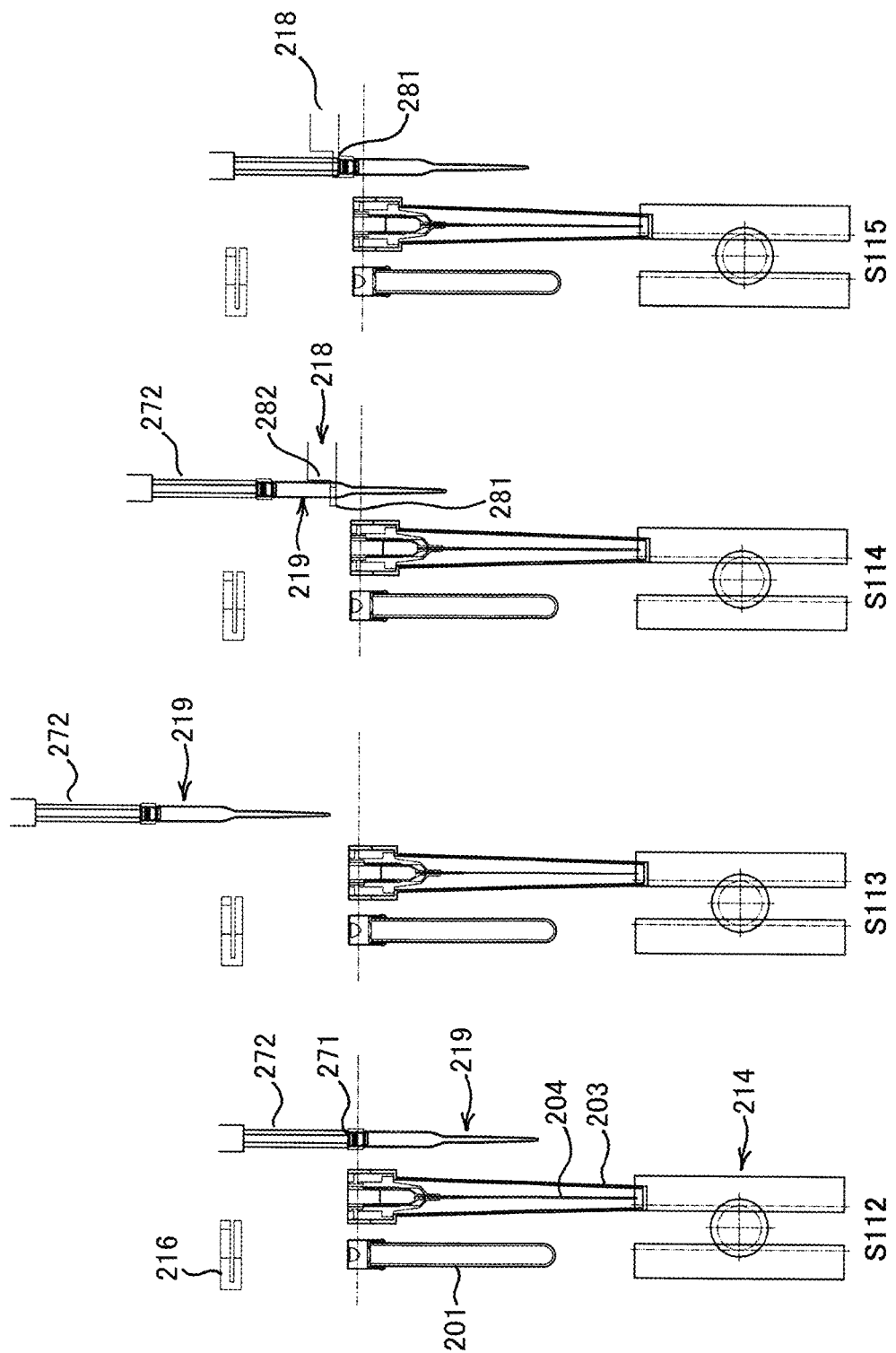

SOFT STOPPER PENETRATING DISPENSING DEVICE AND SOFT STOPPER PENETRATING DISPENSING METHOD

CROSS REFERENCE

This application is a United States national phase application of co-pending international patent application number PCT/JP2015/051143, filed Jan. 16, 2015which claims priority to Japanese patent application number 2014-006243, filed Jan. 16, 2014, the entire disclosures of which are hereby incorporated herein by reference.

TECHNICAL FIELD

The present invention relates to a soft stopper penetrating dispensing device and a soft stopper penetrating dispensing method.

BACKGROUND ART

Traditionally, there is a case where liquid is required to be injected into, suctioned from, or dispensed to a soft stopper sealed container, in which various solutions such as a culture solution, a reagent, and a sample stored therein are sealed with a soft stopper made of a soft material such as a rubber stopper, without removing the rubber stopper. The soft stopper sealed container is, for example, a test tube, a tube, and a bottle.

For example, the soft stopper sealed container is a blood collection bottle which stores blood used for preprocessing to specify the nucleic acid of the target bacteria and virus included in a very small amount of blood collected from a patient or a culture bottle to culture bacteria, cells, and viruses included in the blood and the like. An opening part of the container is sealed with the rubber stopper so as to prevent contamination into the blood or the culture solution stored in the container.

In order to prevent the contamination and cross contamination, the sample solution is suctioned from the blood collection bottle and the culture bottle, in which the sample such as the collected blood is stored, by inserting a dispensing needle into the rubber stopper and suctioning the sample solution through the dispensing needle with manpower without removing the rubber stopper.

However, when a suction and discharge operation is performed by inserting the dispensing needle into the rubber stopper, since the airtightness in the container is maintained, the pressure in the container at the time of the suction and discharge is different from the atmospheric pressure. This may make accurate dispensation be difficult. Also, due to the suction and discharge, the internal pressure of the dispensing cylinder is excessively decreased or increased, and a load is imposed on a user. Especially, at the time of the suction, the internal pressure of the dispensing cylinder is excessively decreased, and there is a possibility that the sample is scattered when the dispensing needle is pulled out from the soft stopper. In addition, an accident may occur such that the user is wrongly stung by the dispensing needle and is infected with bacteria. Also, there has been a problem in that a possibility of clogging and damage of the dispensing needle gets larger when a large load is applied to the dispensing needle in a case where the dispensing needle is formed to be as thin as possible when a very small amount of liquid is treated and is formed to be long according to the shape of the container such as a test tube.

CITATION LIST

Patent Literature

Patent Literature 1: JP 2007-159464 A

SUMMARY OF INVENTION

Technical Problem

The present invention has been made to solve the above problems. A first purpose of the present invention is to provide a soft stopper penetrating dispensing device and method which can consistently and efficiently perform processing including preprocessing to a sample, extraction, amplification, and measurement with high safety and reliability and high speed by suctioning, discharging, or dispensing liquid without manpower and without removing a soft stopper made of a soft material such as a rubber stopper.

A second purpose is to provide a soft stopper penetrating dispensing device and method which can perform processing with high reliability by preventing a damage and clogging of a dispensing needle tip for suctioning, discharging, or dispensing liquid without removing a soft stopper.

A third purpose is to provide a soft stopper penetrating dispensing device and method with high reliability which can easily and accurately perform positioning relative to a soft stopper by a punching tip of the soft stopper (only necessary to be slightly longer than the thickness of the soft stopper) instead of a dispensing needle tip which needs to reach a suction liquid level in a container.

A fourth purpose is to provide a soft stopper penetrating dispensing device and method with high quantitativity which can accurately dispense liquid to a soft stopper sealed container sealed with a soft stopper without removing the soft stopper made of a soft material such as a rubber stopper.

A fifth purpose is to provide a soft stopper penetrating dispensing device and method which can inexpensively provide an simple and compact device by integrating a device for dispensing liquid including suction and discharge of liquid relative to a soft stopper sealed container made of a soft material such as a rubber stopper and a device for boring the soft stopper and performing above processing by the single device.

A sixth purpose is to provide a soft stopper penetrating dispensing device and method which can realize smooth processing with high reliability by performing boring processing to a soft stopper made of a soft material such as a rubber stopper and performing suction, discharge, or dispensing processing to liquid with separate exclusive parts.

Solution to Problem

A first invention is a tip combination body including a punching tip which is formed in a tapered shape and made of a hard material having a through-hole along the vertical direction and a dispensing needle tip provided to be able to suction and discharge liquid.

A lower part of the dispensing needle tip is provided to be able to be inserted into and pass through the through-hole from the upper side of the punching tip, and an upper part of the dispensing needle tip is provided so as to store the liquid. The tip combination body configured of the dispensing needle tip and the punching tip is provided so as to be attached to a dispensing nozzle provided to be able to suction and discharge gas.

Here, the "hard material" is opposed to the "soft material", and the "soft material" includes a polymer substance such as soft resin including natural rubber and silicone, and a natural material such as natural rubber and cork. The "hard material" is a material which can bore the soft stopper made of the soft material and includes metal, hard resin, glass, ceramics, pottery, and mineral ores. The punching tip can bore the soft stopper.

The shape and size of the "through-hole" are set to be in a state where the tip lower part of the dispensing needle tip is loosely fitted into or loosely passes through the through-hole without contacting each other or in a state where the tip lower part of the dispensing needle tip can slide although the tip lower part of the dispensing needle tip has contact with the through-hole. A gap is provided between the inner surface of the through-hole and the outer surface of the tip lower part of the dispensing needle tip. The tip upper part of the dispensing needle tip does not need to be inserted into and pass through the through-hole.

Since the tip lower part of the dispensing needle tip can be inserted into and pass through the through-hole, it is necessary to form the length of the tip lower part (needle to be described) of the dispensing needle tip to be longer than that of the through-hole. Since "the lower part of the dispensing needle tip is provided to be able to be inserted into and pass through the through-hole from the upper side of the punching tip", at least the axis of the lower part of the dispensing needle tip needs to pass through the through-hole.

The "boring" includes a case where a hole with a bottom or a groove is provided in the object and a case where the through-hole is provided in the object. It is preferable that the tip combination body is combined in a state where the lower part of the dispensing needle tip is inserted into and passes through the through-hole of the punching tip.

A second invention is a tip combination body in which the lower part of the punching tip includes a punching pipe having the through-hole provided therein, and the upper part of the punching tip includes a supporting pipe formed to be thicker than the punching pipe. Also, the upper part of the dispensing needle tip can be held, stored, and loosely inserted in the supporting pipe in a state where the lower part of the dispensing needle tip is inserted into the through-hole.

The supporting pipe is provided to be able to be attached to a mounting member provided outside the tip combination body. In a case where an opening part on the upper side of the supporting pipe is fitted into and attached to the mounting member, the pipe is especially referred to as a "fitting pipe". In this case, processing is performed in a state where the dispensing needle tip is positioned above the supporting pipe including the mounting member. The dispensing needle tip can be moved independently of the punching tip. It is preferable that the tip combination body be combined and stored in a tip storing unit in a state where the upper part (storage tube to be described) of the dispensing needle tip can be attached to the dispensing nozzle. The punching tip cannot be moved by moving the dispensing nozzle (dispensing moving mechanism to be described). Therefore, it is necessary to provide a mechanism to move the punching tip (dispensation available punching head to be described or storing unit moving mechanism to be described).

A third invention is a soft stopper penetrating dispensing device including a dispensation available punching head which is provided to be relatively movable relative to a stage where a soft stopper sealed container which can store liquid and of which an opening part is sealed with a soft stopper made of a soft material can be placed, a punching tip which is provided in the dispensation available punching head, includes a through-hole along the vertical direction, is formed in a tapered shape, and is made of a hard material, a dispensing needle tip which can be moved relative to the head by a dispensing moving mechanism provided in the dispensation available punching head and is provided to be able to suction and discharge the liquid, and a control unit which controls at least the suction and discharge, relative movement of the dispensation available punching head, and the dispensing moving mechanism. The dispensing needle tip and the punching tip are provided to be relatively and independently movable in the vertical direction by the dispensation available punching head and the dispensing moving mechanism, and the lower part of the dispensing needle tip is provided to be able to be inserted into the through-hole from the upper side of the punching tip.

Here, the "stage" indicates a region where the dispensation available punching head can be relatively moved. Since the above movement includes "relative" movement, a case where the stage is moved, a case where the dispensation available punching head is moved, and a case where both of them are moved are included. The case where the stage is moved is a case where a stage moving mechanism which moves the stage itself or a storing unit moving mechanism which can move various storage units provided on the stage in a predetermined direction is included. The various storage units include at least the soft stopper sealed container and the tip storing unit which can store the tip combination body in which the dispensing needle tip and the punching tip are combined. By storing and holding the tip combination body in which the dispensing needle tip and the punching tip are combined in the tip storing unit, the dispensing needle tip and the punching tip can be moved, stored, held, used, or discarded as the tip combination body. When the stage moving mechanism or the storing unit moving mechanism is used, it is not necessary to move the dispensation available punching head in the predetermined direction. For example, the predetermined direction is the "vertical direction". The "soft stopper" includes a rubber stopper and the like. It is preferable that a flange and the like be provided not to be dropped in the container and the soft stopper be supported by the edge of the opening part of the soft stopper sealed container when the punching pipe of the punching tip bores the soft stopper.

Here, it is preferable that the "control unit" include a CPU or a microcomputer, a memory, a program, an AD converter, a DA converter, a display, and an input device such as a keyboard, a touch screen, and a mouse. The moving mechanism of the dispensation available punching head, the dispensing moving mechanism, and the suction and discharge mechanism are controlled by converting digital signals from the computer into analog signals specific for each mechanism.

It is preferable that the upper part of the dispensing needle tip be provided so as to be able to be held, stored, or loosely inserted in the upper part of the punching tip. According to this, the tip combination body can be stably stored or held in the tip storing unit or can be easily discarded. Here, the "upper part of the punching tip" corresponds to the "supporting pipe" which is formed to be thicker than the "punching pipe" corresponding to the lower part of the punching tip. The punching pipe bores the soft stopper.

A fourth invention is a soft stopper penetrating dispensing device further including a pressure sensor which detects the pressure of gas in the dispensing needle tip.

According to the present invention, the lower part of the dispensing needle tip is provided to be able to be inserted into the through-hole of the punching tip. Therefore, when the punching tip bores the soft stopper and the lower part of the dispensing needle tip is inserted into the through-hole and liquid stored in the soft stopper sealed container is suctioned or discharged, the soft stopper sealed container communicates with the air through a gap between the through-hole and the lower part of the dispensing needle tip. Therefore, by detecting a rapid change of the pressure of the gas in the dispensing needle tip by the pressure sensor, the pressure sensor can detect that the front end of the dispensing needle tip has reached the liquid level in the soft stopper sealed container, and quantitative suction and discharge of the liquid can be performed.

A fifth invention is a soft stopper penetrating dispensing device in which the dispensation available punching head includes a mounting member to which the upper part of the punching tip can be attached. In the fifth invention, the punching tip is detachably attached to the mounting member, and the lower part of the dispensing needle tip is provided so as to be able to be inserted into the attached punching tip.

Here, when the punching tip is fitted into and attached to the mounting member, it is necessary to position the dispensing needle tip above the mounting member. Therefore, the "punching tip is detachably attached to the mounting member from the lower side".

The "mounting member" is a member to which the upper part of the punching tip can be attached. At least, the lower part of the dispensing needle tip can pass through the mounting member. When the upper part of the punching tip is fitted into and attached to the mounting member, the mounting member is a mounting hollow member having a cavity at its center. At least the axis of the lower part of the dispensing needle tip needs to pass through the through-hole and the cavity of the mounting hollow member. The "detachable" means "attachable" and "detachable". In this case, the "supporting pipe" on the upper side of the punching tip corresponds to the "fitting pipe".

In order to be fitted into the mounting hollow member or be able to be attached to the other holding mounting member, the "supporting pipe" on the upper side of the punching tip is formed to be thicker than the lower part of the punching tip which can bore the soft stopper. Alternatively, a projecting part such as a flange, a protuberance, and a projection is provided along the outer periphery, and the lower part of the punching tip is positioned below the mounting hollow member and is held by using the thickness and the width of the projecting part.

A sixth invention is a soft stopper penetrating dispensing device in which the dispensation available punching head includes an arm member which is movably provided forward and backward relative to the axis of the punching tip attached to the mounting member or the dispensing needle tip attached to the dispensing nozzle below the mounting member. It is preferable that the arm member support the punching tip attached to the mounting member from the lower side by moving forward and be also used as a detaching member to be described or be the detaching member. In addition, it is preferable to provide a magnet which can give a magnetic field in a thin tube of an extracting dispensation tip attached to the dispensing nozzle.

Here, the "axis of the dispensing needle tip" coincides with a straight line extending in the vertical direction so as to pass through a cavity when the mounting member has the cavity (through line of mounting member). For example, the straight line includes a center axis line and a symmetric axis line. It is preferable that the "forward and backward movement" be performed along the horizontal direction.

A seventh invention is a soft stopper penetrating dispensing device in which the dispensation available punching head includes a dispensing nozzle which is provided to be movable relative to the dispensation available punching head by the dispensing moving mechanism and can suction and discharge gas. The upper part of the dispensing needle tip is detachably attached to the dispensing nozzle, and the dispensation available punching head has a detaching member which can detach the dispensing needle tip from the dispensing nozzle by partially blocking a moving path of the dispensing needle tip to the upper side by the dispensing moving mechanism.

The upper part of the dispensing needle tip is formed to be thicker than the tip lower part of the dispensing needle tip which can be inserted into the through-hole so as to be able to be fitted into and attached to the dispensing nozzle. Alternatively, it is preferable that a projecting part such as a flange, a protuberance, and a projection be provided along the outer periphery and the dispensing needle tip be detachable from the dispensing nozzle by using the thickness and the width of the projecting part.

It is necessary to attach the dispensing needle tip to the dispensing nozzle before the punching tip is attached to the mounting hollow member. Also, it is necessary to detach the dispensing needle tip from the dispensing nozzle after the punching tip is detached from the mounting hollow member or before the punching tip is attached to the mounting hollow member.

It is preferable to provide the detaching member in the dispensation available punching head to be slidable by a motor. Also, it is preferable to use the arm member as the detaching member.

An eighth invention is a soft stopper penetrating dispensing device including a storing unit moving mechanism which can move the soft stopper sealed container placed on the stage and/or a tip storing unit for storing at least the punching tip relative to the dispensation available punching head at least in the vertical direction.

Here, a case where the soft stopper sealed container is moved in the vertical direction relative to the dispensing nozzle includes a case where the punching tip bores the soft stopper sealed container and a case where the lower part of the dispensing needle tip is inserted into the bored soft stopper sealed container via the punching tip and liquid is suctioned. Also, a case where the punching tip is moved in the vertical direction relative to the mounting member includes a case where the punching tip is attached to the mounting member.

The storage unit and the like can be moved by the dispensation available punching head moving mechanism or the dispensing moving mechanism together with the storing unit moving mechanism.

A ninth invention is a soft stopper penetrating dispensing device which includes an overturning stirrer including a holding member which can hold the soft stopper sealed container in a standing state and a rotation driving unit which can rotate and drive the holding member so as to overturn the container held by the holding member, on the stage.

The control unit controls the overturning stirrer. Since the soft stopper sealed container is sealed with a soft stopper, the soft stopper sealed container can be stirred by rotating and overturning it. It is preferable to bore the soft stopper and perform dispensing process in a state where the soft stopper sealed container is held by the holding member and is not rotated by the rotation driving unit. Therefore, it is preferable to provide the holding member to be able to hold the container from the side of the side wall perpendicular to the standing direction of the soft stopper sealed container in the standing state, that is, from horizontal direction so that the punching tip can reach the soft stopper from above. Since "the container is overturned", the rotation axis of the rotation by the rotation driving unit is perpendicular to the standing direction of the container and passes through the container when the single container is provided. When the plurality of containers is provided, it is preferable that the rotation axis passes through all the containers along the arranging direction in which the containers are aligned. It is preferable that the height position be about half height of the container because this can save a space. The rotation includes a plurality of times of rotations in the same direction and a plurality of times of rotations in different directions one after the other.

A tenth invention is a soft stopper penetrating dispensing device in which a sample tube can be placed on the stage, and an opening part of the sample tube can be detachably attached to the dispensing nozzle, and the sample tube attached to the dispensing nozzle can be detached by using the detaching member.

Here, regarding the attachment of the sample tube, the dispensing nozzle is fitted into and is attached to the opening part of the sample tube by descending the dispensing nozzle to which the dispensing needle tip is not attached. Regarding the detachment of the sample tube, the sample tube is detached from the dispensing nozzle by blocking the moving path of the sample tube to the upper side by the dispensing moving mechanism by the detaching member before the punching tip is attached.

An eleventh invention is a soft stopper penetrating dispensing device including the control unit. The control unit positions the dispensation available punching head above the soft stopper sealed container placed on the stage by relatively moving the dispensation available punching head relative to the stage and bores the soft stopper by descending the punching tip by the dispensation available punching head or the storing unit moving mechanism. After boring, the control unit descends the dispensing needle tip by the dispensing moving mechanism or the storing unit moving mechanism. Then, the control unit performs control so that the lower part of the dispensing needle tip is inserted into the through-hole and the soft stopper and enters the soft stopper sealed container and that liquid is suctioned or discharged.

When a pressure sensor is included, it is preferable that the control unit suction the liquid based on the pressure of the gas pressure in the dispensing needle tip detected by the pressure sensor. For example, when the pressure sensor has detected a rapid pressure change, it is determined that the dispensing needle tip has reached the liquid level of the liquid stored in the soft stopper sealed container, and the front end of the dispensing needle tip is descended by a predetermined distance from the liquid level, and a predetermined amount of the liquid corresponding thereto is suctioned. Accordingly, quantitative dispensing processing can be performed.

A twelfth invention is a soft stopper penetrating dispensing device including the control unit. The control unit performs control so that the lower part of the dispensing needle tip is inserted into the through-hole and the punching tip and the dispensing needle tip are descended in a combined state when the punching tip is descended by the dispensing moving mechanism or the storing unit moving mechanism and bores the soft stopper.

At the time of boring, for example, it is preferable to perform control so that the front end of the dispensing needle tip is positioned slightly above the front end of the punching tip. According to this, stiffness of the lower part of the dispensing needle tip is strengthened, and a user can use the combination of the dispensing needle tip and the punching tip with a feeling of performing the processing by only the dispensing needle tip. The verb "passing through" includes the meaning of "inserting into".

The thirteenth invention is a soft stopper penetrating dispensing device including the control unit. The control unit performs control so that the punching tip is attached to the mounting hollow member by relatively moving the dispensation available punching head relative to the punching tip placed on the stage and that the punching tip is detached from the mounting member by descending the dispensing needle tip relative to the attached punching tip by the dispensing moving mechanism or the storing unit moving mechanism.

It is preferable that the control unit perform control such that the punching tip is attached to the mounting member after the dispensing needle tip has been attached to the dispensing nozzle by the dispensing moving mechanism or the storing unit moving mechanism relative to the dispensing needle tip placed on the stage and the needle tip is detached from the dispensing nozzle by moving the dispensing needle tip upward by the dispensing moving mechanism relative to the detaching member for blocking the moving path to the upper side of the dispensing needle tip after the punching tip has been detached.

A fourteenth invention is a soft stopper penetrating dispensing device including the control unit. The control unit performs control so that the holding member is rotated and driven so as to overturn the container by the rotation driving unit in a state where the holding member holds the soft stopper sealed container or that the punching tip is descended relative to the soft stopper and bores the soft stopper, and then, is moved up and pulled out from the soft stopper in a state where the holding member holds the soft stopper sealed container.

A fifteenth invention is a soft stopper penetrating dispensing device including the control unit. The dispensing needle tip is attached to the dispensing nozzle by relatively descending the dispensing nozzle by using the dispensing moving mechanism or the storing unit moving mechanism relative to the dispensing needle tip placed on the stage. The punching tip placed on the stage is attached to the mounting member by moving up the front end of the dispensing needle tip relative to the punching tip and relatively descending the punching tip by the dispensation available punching head or the storing unit moving mechanism. After the punching tip is attached to the mounting member, the front end of the dispensing needle tip is inserted into the through-hole by descending the dispensing needle tip and the dispensing needle tip is combined with the punching tip. In this state, the dispensing needle tip and the punching tip bore the soft stopper of the soft stopper sealed container, and the dispensing needle tip is descended and passes through the through-hole to suction the liquid. The dispensing processing is performed by moving up the dispensing needle tip and the punching tip in a combined state and moving them on the stage and descending the dispensing needle tip to pass through the through-hole. The control unit controls the above operations.

A sixteenth invention is a soft stopper penetrating dispensing device including the control unit which performs control regarding the operations below. The dispensation available punching head is positioned above a sample tube placed at a first position of the stage, and the sample tube is detachably attached to the dispensing nozzle by descending the dispensing nozzle by the dispensing moving mechanism or the storing unit moving mechanism. The sample tube is positioned at a second position on the stage by relatively moving the dispensation available punching head, and the sample tube is detached from the dispensing nozzle by moving the dispensing nozzle upward by the dispensing moving mechanism relative to the detaching member for blocking the moving path of the dispensing nozzle.

A seventeenth invention is a soft stopper penetrating dispensing method which includes a positioning process for positioning a punching tip which has a through-hole along the vertical direction and is made of a hard material and formed in a tapered shape above a soft stopper relative to a soft stopper sealed container which is placed on a stage and can store liquid and of which an opening part is made of a soft material and is sealed with a soft stopper, a boring processing for boring the soft stopper by relatively descending the punching tip by the dispensation available punching head, and a suction/discharge process for suctioning/discharging the liquid by relatively descending the dispensing needle tip, which can be moved relative to the head by the dispensing moving mechanism provided in the dispensation available punching head and is provided to be able to suction and discharge the liquid, and making the lower part of the dispensing needle tip pass through the through-hole and the soft stopper and enter the soft stopper sealed container.

Here, in the "positioning process", it is preferable that centerlines or symmetric axis lines of the punching tip, the dispensing needle tip, and the soft stopper sealed container coincide with each other.

It is preferable that the lower part of the dispensing needle tip be inserted into the through-hole of the punching tip by the dispensing moving mechanism so that the dispensing needle tip is combined with the punching tip at the time of the boring processing.

Also, it is preferable to include a process to overturn and stir the soft stopper sealed container by the overturning stirrer before the boring processing of the soft stopper sealed container. According to this, target substances in the solution can be evenly stirred, and processing can be efficiently performed. In addition, it is preferable that the overturning stirrer hold the soft stopper sealed container in a standing state at the time of the boring processing. According to this, the soft stopper sealed container can be surely bored, and suction/discharge can be surely performed.

When the pressure sensor for detecting the pressure of the gas in the dispensing needle tip is used in the suction/discharge process, it is preferable that the liquid be suctioned/discharged based on the pressure of the gas in the dispensing needle tip detected by the pressure sensor.

An eighteenth invention is a soft stopper penetrating dispensing method further including a dispensing needle tip attaching process for attaching the dispensing needle tip to the dispensing nozzle by relatively descending the dispensing nozzle relative to the dispensing needle tip placed on the stage and a punching tip attaching process for attaching the punching tip placed on the stage to the mounting member by moving the dispensing needle tip upward, before the positioning process.

A nineteenth invention is a soft stopper penetrating dispensing method further including a punching tip detaching process for detaching the punching tip from the mounting member and a dispensing needle tip detaching process for detaching the dispensing needle tip from the dispensing nozzle by providing a detaching member to partially block the moving path and moving the dispensing nozzle upward after the punching tip detaching process.

A twentieth invention is a soft stopper penetrating dispensing method further including a dispensing needle tip attaching process for attaching the punching tip to the dispensing nozzle when the punching tip is relatively descended and bores the soft stopper in the boring processing and a punching tip attaching process for attaching the punching tip to the mounting member by the dispensation available punching head or the storing unit moving mechanism by moving the dispensing needle tip upward. In the boring processing, the front end of the dispensing needle tip is inserted into the through-hole by descending the dispensing needle tip, and the dispensing needle tip and the punching tip in a combined state bore the soft stopper of the soft stopper sealed container. The suction/discharge processing includes a liquid transfer process for suctioning the liquid by the dispensing needle tip being inserted into and passing through the through-hole by relatively descending it, moving the dispensing needle tip and the punching tip in the combined state upward and relatively moving them on the stage and a dispensing process for performing dispensing processing by descending the dispensing needle tip and inserting it through the through-hole.

A twenty-first invention is a soft stopper penetrating dispensing method including an overturning and stirring process for stirring the container so as to overturn it in a state where the soft stopper sealed container is held by an overturning stirrer and a standing state maintaining process for maintaining a standing state of the overturned and stirred soft stopper sealed container by holding it by the overturning stirrer in the standing state. It is preferable to perform the "standing state maintaining process" at least at the time of the "boring processing" and in a process partially including the "suction/discharge process" or the "liquid transfer process".

A twenty-second invention is a soft stopper penetrating dispensing method including a positioning process for positioning the dispensation available punching head above the sample tube placed at the first position on the stage, a sample tube attaching process for detachably attaching the sample tube to the dispensing nozzle by relatively descending the dispensing nozzle by the dispensation available punching head, a sample tube transferring process for placing the sample tube at a second position on the stage by relatively moving the dispensation available punching head, and a sample tube detaching process for detaching the sample tube from the dispensing nozzle by moving the dispensing nozzle upward by the dispensing moving mechanism relative to the detaching member for blocking a part of the moving path of the dispensing nozzle.

Advantageous Effects of Invention

According to the first, second, third, eleventh, or the seventeenth invention, the soft stopper of the soft stopper sealed container sealed with the soft stopper is bored by the punching tip without removing the soft stopper, and the dispensing needle tip which can pass through the through-hole of the punching tip passes through the bored soft stopper. Then, the liquid in the soft stopper sealed container can be smoothly suctioned/discharged by the dispensing needle tip. Therefore, a load of a user caused by detachment of the soft stopper and the like is reduced, and contamination and infection to the user is prevented. Also, cross contamination is prevented. Therefore, the processing with high reliability can be performed.

In the present invention, since the soft stopper which is bored by the punching tip and bored by the dispensing needle tip which can pass through the through-hole of the punching tip is used, a large load is not applied to the thin and long dispensing needle tip which passes through the through hole and has small rigidity. The damage of the dispensing needle tip and the clogging by the soft stopper can be prevented, and the processing with high reliability can be performed.

In the present invention, since the dispensing needle tip can enter the container by passing through the through-hole of the punching tip for boring the soft stopper without removing the soft stopper, there is a gap between the dispensing needle tip and the through-hole. Therefore, since the suction/discharge by the dispensing needle tip can be controlled by controlling the pressure in the soft stopper sealed container to be the atmospheric pressure at the time of the suction/discharge, quantitative dispensation can be precisely performed with high accuracy.

Due to the presence of the gap, when the pressure is monitored by mounting the pressure sensor to the suction and discharge e mechanism of the dispensing needle tip, a suction and discharge state of the dispensing needle tip can be perceived, and the control can be performed with high reliability.

When the dispensing needle tip is directly inserted into the soft stopper without using the punching tip, airtightness in the soft stopper sealed container is maintained, and the suction cannot be performed at the atmospheric pressure, and the internal pressure of the dispensing needle tip is excessively decreased. There is a possibility that the sample is scattered when the dispensing needle tip is pulled out from the soft stopper. However, according to the present invention, the scattering of the sample can be prevented.

In the present invention, the tip lower part of the dispensing needle tip needs to be long enough to reach the bottom of the soft stopper sealed container such as the test tube. The length sufficient to be longer than the thickness of the soft stopper is enough for the punching tip. According to the present invention, the punching tip is provided in the dispensation available punching head, and the front end of the punching tip can be positioned and controlled more accurately than the front end of the dispensing needle tip provided in the dispensing moving mechanism on the dispensation available punching head. Therefore, boring can be accurately and surely performed.

In the present invention, the dispensing needle tip into which the punching tip is inserted passes through the soft stopper, and the lower part of the dispensing needle tip enters the soft stopper sealed container. Therefore, components necessary for the boring processing and the dispensing processing are integrated, and the enlargement of the device size can be prevented. Also, the dispensing needle tip is guided by the punching tip and can surely and safely enter the container, and the suction/discharge operation can be smoothly performed.

In the present invention, since the boring operation and the suction/discharge operation can be performed by exclusive parts suitable for the respective operations, the processing can be performed with higher accuracy and reliability than those of a case where a single part performs both the boring operation and the suction/discharge operation.

According to the fourth invention, since the gap is provided between the dispensing needle tip and the through-hole of the punching tip, the suction and discharge state of the dispensing needle tip can be perceived by monitoring the pressure of the gas in the dispensing needle tip by the pressure sensor mounted to the suction and discharge mechanism of the dispensing needle tip. The control can be performed with higher reliability. Especially, the liquid level of the sample solution and the like in the soft stopper sealed container is detected, and necessary amount of liquid is suctioned by inserting the front end of the dispensing needle tip by a predetermined depth from the liquid level. Accordingly, the dispensing processing with accurate quantitativity can be performed.

According to the first, the second, or the eighth invention, when the upper part of the dispensing needle tip can be held, stored, or loosely inserted in the supporting pipe, the dispensing needle tip and the punching tip can be stored, used, cleaned up, and discarded as the tip combination body. Therefore, the cross contamination can be more surely prevented, and the processing can be performed with high reliability.

According to the fifth, the sixth, the thirteenth, the fifteenth, or the eighteenth invention, the punching tip is removably attached to the mounting member and used. Therefore, the punching tip can be exchanged for each soft stopper sealed container, and the dispensing needle tip can be attached and detached. Therefore, the cross contamination can be surely prevented, and the processing can be performed with high reliability.

Also, since the punching tip can be easily exchanged, the punching tip suitable for each of the various kinds of soft stoppers and dispensing needle tips can be used, and the soft stopper penetrating dispensing device can be versatilely used.

According to the seventh, the fifteenth, the eighteenth, or the nineteenth invention, the dispensing needle tip is detachably attached to the dispensing nozzle. Therefore, since the dispensing needle tip can be exchanged for each soft stopper sealed container, the cross contamination can be surely prevented, and the processing can be performed with high reliability.

Also, since the dispensing needle tip can be easily exchanged, the dispensing needle tip suitable for each of various kinds of soft stopper sealed containers and punching tips can be used, and the soft stopper penetrating dispensing device can be versatilely used.

According to the eighth invention, by providing the storing unit moving mechanism which can move the soft stopper sealed container and/or at least the punching tip relative to the dispensing nozzle provided in the dispensation available punching head or the mounting member, an operation range of the dispensation available punching head or the dispensing moving mechanism can be reduced. The enlargement of the device size can be prevented, and the structure and control content of the device can be simplified. Also, the processing can be quickly performed. Also, the tip combination body in which the punching tip and the dispensing needle tip are combined can be moved, used, stored, or discarded. Accordingly, the cross contamination can be surely prevented, and the processing can be performed with high reliability.

According to the tenth, the sixteenth, or the twenty-second invention, the sample tube can be automatically attached to the dispensing nozzle and be moved on the stage without manpower. Therefore, the cross contamination can be surely prevented, and the processing can be performed by using a component necessary for a dispensing device. Accordingly, a compact device with high work efficiency can be provided.

According to the ninth, the fourteenth, or the twenty-first invention, by overturning and stirring the soft stopper sealed container, the solution stored in the container is evenly stirred, and the processing can be efficiently performed. In addition, by boring the soft stopper and performing the dispensing processing in a state where the holding member holds the soft stopper sealed container, the boring processing and the dispensing processing can be surely performed. Since these functions are realized by the single device, the enlargement of the device size can be prevented.

According to the second, the twelfth, the fifteenth, and the twentieth invention, the front end of the dispensing needle tip is inserted into the through-hole of the punching tip, and the processing is performed in a state where the dispensing needle tip and the punching tip are combined. Therefore, this is the same as to strengthen the stiffness of the lower part of the dispensing needle tip, and the user can use the combination of the dispensing needle tip and the punching tip with a feeling of performing the processing by only the dispensing needle tip. Also, a fragment of the soft stopper is prevented from remaining in the through-hole of the punching tip, and the clogging of the punching tip can be prevented. Also, the front end of the dispensing needle tip is protected.

BRIEF DESCRIPTION OF DRAWINGS

FIG. 1 is a perspective view of a whole soft stopper penetrating dispensing device according to a first embodiment of the present invention.

FIG. 2 is a perspective view of a main part of the soft stopper penetrating dispensing device illustrated in FIG. 1.

FIG. 3 is an enlarged perspective view of a part of the soft stopper penetrating dispensing device illustrated in FIG. 2.

FIG. 4 is a perspective view of the soft stopper penetrating dispensing device illustrated in FIG. 2 for performing an operation in step S12.

FIG. 5 is a perspective view of the soft stopper penetrating dispensing device illustrated in FIG. 2 for performing operations in steps S17 and S18.

FIG. 6 is a perspective view of the soft stopper penetrating dispensing device illustrated in FIG. 2 for performing operations in steps S'1 to S'6.

FIG. 7 is a perspective view of a main part of a soft stopper penetrating dispensing device according to a second embodiment of the present invention.

FIG. 8 is a side view of the soft stopper penetrating dispensing device illustrated in FIG. 7 when a tip is attached.

FIGS. 9(a) to 9(f) are enlarged cross sectional diagrams of a blood collection tube and the like used in the soft stopper penetrating dispensing device illustrated in FIG. 7.

FIG. 10 is a side view of the soft stopper penetrating dispensing device illustrated in FIG. 7 when the tip is not attached.

FIG. 11 is a diagram of an operation flow of the soft stopper penetrating dispensing device illustrated in FIG. 7.

FIG. 12 is a diagram of an operation flow of the soft stopper penetrating dispensing device illustrated in FIG. 7.

FIG. 13 is a diagram of an operation flow of the soft stopper penetrating dispensing device illustrated in FIG. 7.

DESCRIPTION OF EMBODIMENTS

A soft stopper penetrating dispensing device and a soft stopper penetrating dispensing method according to the embodiments of the present invention are described with reference to the drawings. Descriptions on the embodiments should not be understood as a limitation of the present invention unless specified otherwise.

FIGS. 1 to 6 are views of a soft stopper penetrating dispensing device and a soft stopper penetrating dispensing method according to a first embodiment of the present invention.

FIG. 1 is an outline of a whole soft stopper penetrating dispensing device 10 according to the first embodiment of the present invention.

The soft stopper penetrating dispensing device 10 mainly includes a stage 100, for example, where a sample is cultured, a dispensation available punching head 11, a dispensation available punching head moving mechanism 14 which can move the dispensation available punching head 11 relative to the stage 100 in a X-axis direction, a Y-axis direction, and a Z-axis direction on the stage 100, other processing region 108, for example, where the sample is inspected, a conveyance body 106 (corresponding to second position) in which a hole for holding a sample tube 6 to be described is provided and which can convey the sample tube, and a conveyance path 107 through which the conveyance body 106 is conveyed from the stage 100 to the other processing region 108.

The stage 100 further includes an overturning stirrer 101, a punching tip storing unit 102 for storing a plurality of (six in this example) punching tips 12, a dispensing needle tip storing unit 103 for storing a plurality of (six in this example) dispensing needle tips 13, a liquid discarding unit 104 for discarding liquid, a sample tube storing unit 105 (corresponding to the first position) for storing a sample tube 6 for storing a plurality of (six in this example) samples. The overturning stirrer 101 holds a plurality of (six in this example) soft stopper sealed containers 1 in a state where the soft stopper sealed containers 1 can be overturned. The soft stopper sealed container 1 is sealed with a soft stopper 2, and culture solution for culturing the sample is sealed in the soft stopper sealed container 1.

In the overturning stirrer 101, a holding member 101a is provided which holds all the soft stopper sealed containers 1 from the side along the arranging direction and at the height position about half of the soft stopper sealed container 1. Also, a rotation driving unit (not shown) is provided in the stage 100. The rotation driving unit rotates and drives the holding member 101a by a motor which is coupled with the holding member 101a and has a rotation axis along the arranging direction so that all the held soft stopper sealed containers 1 are simultaneously overturned in a square recess. Also, the soft stopper sealed containers 1 are held by the holding member 101a of the overturning stirrer 101 so as to punch the soft stopper 2 and to perform dispensing processing in a state where the soft stopper sealed containers 1 are fixed. Here, for example, the holding member 101a holds the containers 1 by pressing them with press members such as fasteners from both sides by using two gripping plates, and the side of the gripping plate for contacting with the soft stopper sealed container 1 is covered with elastic body such as rubber. On one gripping plate, partition plates or partition rods for individually partitioning soft stopper sealed containers 1 are projected perpendicularly to the gripping plate. A fastener is provided at a front end of the partition plate or the partition rod, and the fastener can be engaged with an engaging part such as a groove or a hole provided in the other gripping plate. It is preferable that the partition rod be covered with the elastic body.

The dispensation available punching head moving mechanism 14 can move the dispensation available punching head 11 relative to the stage 100 in the horizontal direction (X-axis direction and Y-axis direction) and the vertical direction (Z-axis direction).

The dispensation available punching head moving mechanism 14 includes a X-axis mobile body 43 which is moved and driven by a X-axis moving mechanism (not shown) in the X-axis direction and includes the X-axis moving mechanism and a Y-axis moving mechanism 14Y provided therein, a Y-axis mobile body 44 which is moved and driven in the Y-axis direction by the Y-axis moving mechanism 14Y provided in the X-axis mobile body 43 and can be moved on the X-axis mobile body 43 in the Y-axis direction, and a Z-axis mobile body which is moved and driven in the Z-axis direction by a Z-axis moving mechanism 14Z provided on the Y-axis mobile body 44 and can be moved on the Y-axis mobile body 44 in the Z-axis direction. The dispensation available punching head 11 is provided in the Z-axis mobile body. Therefore, the dispensation available punching head 11 is provided to be movable relative to the stage 100 in the horizontal direction (X-axis direction and Y-axis direction) and the vertical direction (Z-axis direction) over the whole stage 100. For example, the X-axis moving mechanism, the Y-axis moving mechanism 14Y, and the Z-axis moving mechanism 14Z can be formed of ball screws or timing belts provided to be respectively extended in the X-axis direction, the Y-axis direction, and the Z-axis direction. In the Z-axis moving mechanism 14Z, a ball screw 42 and a motor 41 for rotating and driving the ball screw 42 are provided in the Y-axis mobile body 44.

Also, a control unit (not shown) which controls at least the suction/discharge, the movement of the dispensation available punching head, and a dispensing moving mechanism is electrically connected to the dispensation available punching head 11, the overturning stirrer 101, the dispensation available punching head moving mechanism 14, and the like provided in the stage 100. The control unit includes a CPU, a memory, a program, a liquid crystal display, a keyboard, a mouse, a touch screen, an AD converter, a DA converter, and the like.

FIG. 2 is a perspective view of the dispensation available punching head 11 of the soft stopper penetrating dispensing device 10 according to the embodiment of the present invention. The dispensation available punching head 11 is movably provided in the horizontal direction (X-axis direction and Y-axis direction) and the vertical direction (Z-axis direction) relative to the stage 100 on which the soft stopper sealed container 1 (refer to FIGS. 1 and 4) sealed with the soft stopper 2 can be placed. The dispensation available punching head 11 includes the punching tip 12 and the dispensing needle tip 13. The punching tip 12 is provided in the dispensation available punching head 11 and includes a through-hole 21 along the vertical direction. The punching tip 12 is formed in a tapered shape and is made of stainless as a hard material. The dispensing needle tip 13 is provided in the dispensation available punching head 11 via the dispensing moving mechanism 15 which is provided in the dispensation available punching head 11 and can be moved in the vertical direction (Z-axis direction) and can suction and discharge liquid. The dispensing needle tip 13 is provided above the punching tip 12 so that axes are overlapped with each other, and a lower part 31 of the dispensing needle tip 13 is provided to be able to be inserted into the through-hole 21 from the upper side of the punching tip 12.

In FIG. 2, a reference numeral 16 indicates a mounting member provided in the dispensation available punching head 11, and the punching tip 12 is mounted under the mounting member. A reference numeral 17 indicates a dispensing support part for supporting the dispensing needle tip 13 which is driven so as to be moved by the dispensing moving mechanism 15 in the vertical direction. A reference numeral 18 indicates an arm member and a member which supports the mounted punching tip 12 from the lower side. The arm member is provided in a state where the arm member can be moved forward and backward in the horizontal direction relative to the punching tip 12. The arm member 18 is also used as a detaching member which detaches the dispensing needle tip 13 from the dispensing support part 17.

In FIG. 2, the dispensation available punching head 11 includes a bottom plate 11a, a vertical plate 11b, a top plate 11c, and a dispensation available punching head hanging rod 11d, and the dispensation available punching head 11 is coupled to the Z-axis mobile body of the dispensation available punching head moving mechanism via the hanging rod 11d.

As illustrated in FIG. 2, the punching tip 12 includes a punching pipe 22, a fitting pipe 23, a funnel-shaped transfer part 24, and a flange 26 (refer to FIG. 5). The through-hole 21 extending in the vertical direction is provided in the punching pipe 22, and the punching pipe 22 is formed in a tapered shape toward the front end 25 by being obliquely cut. The fitting pipe 23 communicates with the punching pipe 22 and is used as a supporting pipe which has a larger diameter than the punching pipe 22 and is attached as being fitted into a mounting hollow member 61 of the mounting member 16 to be described. The funnel-shaped transfer part 24 smoothly couples the punching pipe 22 with the fitting pipe 23. The flange 26 is provided along the outer periphery of the fitting pipe 23. At least, the punching pipe 22 is made of stainless steel as a hard material and has the strength capable of boring the soft stopper made of rubber as a soft material.

The height of the punching pipe 22 is, for example, 20 mm and is longer than the thickness of the soft stopper 2 of the soft stopper sealed container 1, for example, five mm. For example, the outer diameter of the punching pipe 22 is 1.2 mm, and the inner diameter is 0.9 mm. When the strength of the dispensing needle tip 13 is strong enough, a case is included where the punching pipe 22 has the thickness which can be bored by the dispensing needle tip 13 such as a hole with the bottom or a groove formed by boring the soft stopper even when the punching pipe 22 does not pass through the soft stopper 2. The height of the fitting pipe 23 is, for example, 30 mm, and the flange 26 is formed at the height position, for example, at 10 mm from the lower side of the fitting pipe 23.

In FIG. 2, the dispensing needle tip 13 includes a thin-tube tip lower part 31, a thick-tube tip upper part 33, a funnel-shaped transfer part 32, and an arrow feather part 34. The outer diameter of the tip lower part 31 is smaller than the inner diameter of the through-hole 21. For example, the outer diameter of the tip lower part 31 is 0.7 mm. The inner diameter of the tip lower part 31 is 0.5 mm. The height of the tip lower part 31 is, for example, 110 mm which is longer than the length of the through-hole 21, and the tip lower part 31 is provided so as to pass through the through-hole 21. The tip upper part 33 is formed to be thicker than the tip lower part 31 and includes a mounting opening 35 of which the upper side can be fitted into the front end of a dispensing nozzle 71 to be described. The funnel-shaped transfer part 32 is smoothly formed without having steps and communicates the tip upper part 33 with the tip lower part 31. The arrow feather part 34 is provided to be projected along the outer periphery of the tip upper part 33. It is preferable to prevent the liquid, which is suctioned when a filter which is provided to vertically partition the tip upper part 33 and through which air can pass and the tip upper part 33 is attached to the dispensing nozzle 71, from having contact with the dispensing nozzle 71.

In FIG. 2, the dispensing moving mechanism 15 includes a ball screw 51 and a motor 55. A first end 52 of the ball screw 51 is supported by the bottom plate 11*a*, and a second end 53 of the ball screw 51 is coupled to a coupler 54 provided on the top plate 11*c*. The motor 55 is provided on the top plate 11*c* and coupled to the coupler 54 so as to rotate and drive the ball screw. The ball screw 51 is screwed with a nut part 74 provided on the dispensing nozzle support 73 to be described, and the rotation of the ball screw 51 vertically moves the dispensing nozzle support 73. According to this, the dispensing needle tip 13 can be vertically moved relative to the dispensation available punching head 11, that is, the punching tip 12.

In FIG. 2, the mounting member 16 includes a cylindrical mounting hollow member 61 and a seat plate 62. The mounting hollow member 61 is provided to be projected upward from an opening bored and provided in the bottom plate 11*a* of the dispensation available punching head 11 and has a cavity 63 which is formed along the vertical direction. The cavity 63 has the size and the shape to which the fitting pipe 23 of the punching tip 12 is fitted through the opening. The seat plate 62 is formed to be extended outward under the mounting hollow member 61. The cavity 63 of the mounting hollow member 61 is opened downward as passing through the bottom plate 11*a*. It is necessary to form the inner diameter of the cavity 63 to be larger than the outer diameter of the arrow feather part 34 in order to detach the punching tip 12 from the mounting hollow member 61 by moving down the dispensing needle tip 13. Also, when the inner diameter of the fitting pipe 23 of the punching tip 12 is formed to be smaller than the outer diameter of the arrow feather part 34, the punching tip 12 can be detached from the mounting hollow member 61 by the arrow feather part 34.

In FIG. 2, the dispensing support part 17 includes the dispensing nozzle 71 to which the dispensing needle tip 13 is attached, the dispensing nozzle support 73 on which the dispensing nozzle 71 and the nut part 74 screwed with the ball screw 51 are provided, and a flow tube 72 which communicates the dispensing nozzle 71 with a suction and discharge mechanism such as a cylinder which is not shown. A reference numeral 75 indicates a guide rod to guide the movement of the dispensing nozzle support 73. Also, a pressure sensor which detects the pressure of gas in the dispensing needle tip 13 attached to the dispensing nozzle 71 is provided in the flow tube 72.

In FIG. 2, the arm member 18 includes a substantially rectangular arm plate 81, a guiding frame 83 which is attached to the lower side of the bottom plate 11*a* and slidably supports the arm plate 81, an actuator 85 which has a linear motor to drive the arm plate 81 forward and backward provided therein, and a pedestal 84 which is provided on the bottom plate 11*a* and on which the actuator 85 is placed. The arm plate 81 is provided to be movable in the front-back direction relative to the axis of the punching tip 12 attached to the mounting hollow member 61 along the horizontal direction on the lower side of the bottom plate 11*a*. The arm plate 81 is elastically energized to move forward in the horizontal direction relative to the axis by an elastic member such as a spring which is not shown and can move the arm plate 81 backward from the axis by the actuator 85.

FIG. 3 is a diagram of the arm plate 81 illustrated in FIG. 2 which is extracted and enlarged. A notch 82 is provided in the arm plate 81. Supporting notches 82*a* are provided on the side of the front end of the notch 82 and are engaged with the fitting pipe 23 of the punching tip 12. A detaching notch 82*b* which detaches the dispensing needle tip 13 from the dispensing nozzle 71 is provided next to the supporting notch 82*a*.

The supporting notch 82*a* is formed in a semicircular shaped notch which has the inner diameter smaller than the outer diameter of the flange 26 provided to the fitting pipe 23 and larger than the outer diameter of the fitting pipe 23. Also, in the detaching notch 82*b*, the supporting notch 82*a* which is formed in a semicircular shaped notch smaller than the outer diameter of the arrow feather part 34 and larger than the tip upper part 33 is provided.

In FIG. 3, the reference numeral 86 indicates a long hole in which a driving rod 87 (refer to FIG. 5) is inserted. The driving rod 87 is extended from the actuator 85 and moves the arm plate 81 forward and backward in the horizontal direction. The driving rod 87 constantly moves the arm plate 81 which is elastically energized in the horizontal direction relative to the axis of the mounting hollow member 61 forward and backward by moving along the longitudinal direction of the long hole.

In FIG. 4, the soft stopper sealed container 1 placed on the stage 100 is illustrated.

The soft stopper sealed container 1 includes a mouth part 3 having an opening at the upper end, a container main body 5 which can store the liquid, and a neck part 4 which is provided between the mouth part 3 and the container main body 5 and has the inner diameter smaller than those of the mouth part 3 and the container main body 5. The soft stopper 2 is fitted into the mouth part 3 to seal it, and a lower end of the soft stopper 2 is supported by the neck part 4.

Next, an operation of the soft stopper penetrating dispensing device 10 according to the present embodiment is described.

In step S1, the overturning stirrer 101 holds the plurality of (six in this example) soft stopper sealed containers 1 with the holding member 101*a* in a standing state (normally placed state) at the position about half of the height of the soft stopper sealed container 1. The rotation driving unit rotates and drives the plurality of held soft stopper sealed containers 1 so that the soft stopper sealed containers are overturned based on a rotation axis along the column direction. Accordingly, the liquid sealed in the soft stopper sealed container 1 is stirred.

In step S2, the overturned and stirred soft stopper sealed containers 1 are held by the holding member 101*a* in the standing state, and the standing state is maintained. In the following processes, the soft stopper sealed container 1 is in the standing state maintaining process.

In step S3, the dispensation available punching head 11 is moved by using the X-axis moving mechanism, the Y-axis moving mechanism, and the Z-axis moving mechanism to the upper side of the dispensing needle tip storing unit 103 in which the dispensing needle tip 13 placed on the stage 100 is stored in a state where the mounting opening 35 of the tip upper part 33 comes at the upper end. The dispensing nozzle 71 of the dispensation available punching head 11 is positioned above the stored dispensing needle tip 13, that is, above the mounting opening 35 of the tip upper part 33 of the dispensing needle tip 13. At this time, the arm plate 81 is previously set by the actuator 85 at a position retreated from the axis of the punching tip 12 to be attached.

In step S4, by moving the dispensation available punching head 11 in the Z-axis direction in a state where the dispensation available punching head 11 is stopped in the horizontal direction, the dispensation available punching head 11 descends so that the mounting hollow member 61 of the mounting member 16 surrounds the tip upper part 33 of the dispensing needle tip 13 from the upper side. According to this, the tip upper part 33 of the dispensing needle tip 13 is secured in the mounting hollow member 61.

In step S5, the dispensing nozzle support 73 on which the nut part 74 screwed with the ball screw 51 is provided is descended by rotating and driving the ball screw 51 as the dispensing moving mechanism 15, and the dispensing nozzle 71 projected downward on the lower side of the dispensing nozzle support 73 is attached to the dispensing nozzle 71 by being squeezed into the mounting opening 35 of the dispensing needle tip 13.

In step S6, the dispensing nozzle 71 to which the dispensing needle tip 13 is attached, that is, the dispensing nozzle support 73 is moved up by rotating and driving the ball screw 51 as the dispensing moving mechanism 15, and the front end 36 of the dispensing needle tip 13 is positioned above the mounting hollow member 61.

In step S7, the dispensation available punching head 11 is moved above the punching tip storing unit 102 by the X-axis moving mechanism, the Y-axis moving mechanism, and the Z-axis moving mechanism so that the opening part of the fitting pipe 23 of the punching tip 12 stored in the punching tip storing unit 102 on the stage 100 is positioned at the upper end.

In step S8, by further descending the dispensation available punching head 11 by using the Z-axis moving mechanism in a state where the dispensation available punching head 11 is stopped in the horizontal direction, the fitting pipe 23 of the punching tip 12 is inserted into and fitted into the cavity 63 of the mounting hollow member 61 of the dispensation available punching head 11.

In step S9, the arm plate 81 which is placed at a position retreated from the punching tip 12 to be previously attached by the actuator 85 or the axis of the mounting hollow member 61 is moved forward by the actuator 85, and the arm plate 81 is supported by the supporting notch 82a from the lower side by being engaged with the fitting pipe 23 on the lower side of the flange 26 of the punching tip 12. This state is the state of the soft stopper penetrating dispensing device 10 illustrated in FIG. 2.

In step S10, the X-axis moving mechanism, the Y-axis moving mechanism, and the Z-axis moving mechanism control the position of the front end 25 of the punching pipe 22 of the punching tip 12 in the dispensation available punching head 11 so that the front end 25 can be accurately positioned above the soft stopper sealed container 1 which is held and fixed by the holding member 101a in the standing state in the overturning stirrer 101 on the stage 100.

In step S11, by further descending the dispensation available punching head 11, to which the punching tip 12 is attached, by using the Z-axis moving mechanism, the punching pipe 22 of the punching tip 12 bores and passes through the soft stopper 2, and then the front end 25 enters the container main body 5 through the soft stopper 2. At this time, the ball screw 51 is rotated, driven and descended so that the front end of the tip lower part 31 of the dispensing needle tip 13 is positioned in the through-hole 21, and the front end and the through-hole 21 are combined with each other. This prevents the soft material from remaining in the through-hole 21 of the punching pipe 22 of the punching tip 12, and also, the punching pipe 22 is reinforced.

In step S12, as illustrated in FIG. 4, the dispensing nozzle support 73 is descended by rotating and driving the ball screw 51 as the dispensing moving mechanism 15 provided in the dispensation available punching head 11. Also, the dispensing needle tip 13 attached to the dispensing nozzle 71 provided on the dispensing nozzle support 73 is descended and is inserted into the through-hole 21 of the punching tip 12, and the tip lower part 31 enters the container main body 5.

In step S13, the gas is suctioned or discharged by the cylinder and the like of the suction and discharge mechanism for communicating via the flow tube 72, and the liquid is suctioned or discharged from the lower end of the tip lower part 31 of the dispensing needle tip 13 placed in the container main body 5 of the soft stopper sealed container 1. At this time, the container main body 5 communicates with outside through a gap generated by a difference between the inner diameter and the outer diameter of the tip lower part 31 of the dispensing needle tip 13 and the through-hole 21 of the punching tip 12. Therefore, air can be replaced at the time of suction and discharge, and the pressure of the suction and discharge mechanism can be controlled based on atmospheric pressure. Therefore, the pressure sensor can surely detect the level of the liquid stored in the soft stopper sealed container, and a predetermined volume of the liquid can be suctioned by descending the front end of the dispensing needle tip 13 by a predetermined distance from the liquid level. The quantitative suction or discharge of the liquid with high accuracy can be performed. It is assumed below that sample solution be suctioned from the container 1.

In step S14, when the suction processing in the soft stopper sealed container 1 is terminated, the dispensing needle tip 13 is moved up by rotating and driving the ball screw 51 as the dispensing moving mechanism 15, and the front end is inserted into the through-hole 21 of the fitting pipe 23. In a state where the dispensing needle tip 13 is combined with the punching tip 12, the dispensing needle tip 13 and the punching tip 12 are moved up. Then, the dispensing needle tip 13 and the punching pipe 22 are extracted from the soft stopper sealed container 1. While the state where the dispensing needle tip 13 is combined with the punching tip 12 is maintained and while the suctioned sample solution is held in the dispensing needle tip 13, the dispensation available punching head 11 is transferred above the sample tube 6. Next, the front end of the dispensing needle tip 13 is inserted through the through-hole 21. Then, the front end is inserted into the sample tube 6, and the sample solution is discharged and dispensed into the sample tube 6.

In step S15, the dispensation available punching head 11 is moved up by the Z-axis moving mechanism, and the punching tip 12 and the dispensing needle tip 13 are moved up together. The dispensation available punching head 11 is moved on the stage by the X-axis moving mechanism and the Y-axis moving mechanism and is positioned above the empty punching tip storing unit 102 in which the punching tip 12 has been stored or a discarding unit.

In step S16, the support of the punching tip 12 is released by moving the arm plate 81, which is provided in the dispensation available punching head 11 and has supported the punching tip 12, backward by using the actuator 85.

In step S17, by descending the dispensing needle tip 13 by using the ball screw 51 as the dispensing moving mechanism 15, the punching tip 12 is detached downward by using the arrow feather part 34 provided in the dispensing needle tip 13 or by detaching the fitting pipe 23 of the punching tip 12 from the mounting hollow member 61 at the tip upper part 33. FIG. 5 is a diagram of the soft stopper penetrating dispensing device immediately after the punching tip 12 has been detached.

In step S18, after the punching tip 12 has been detached from the mounting hollow member 61, the arm plate 81 positioned at the retreated position in the dispensation available punching head 11 is moved forward to the axis again by moving the driving rod 87 of the actuator 85 forward. FIG. 5 is a diagram of a state where the tip upper part 33 of the dispensing needle tip 13 from which the punching tip 12 is detached is positioned below the mounting hollow member 61.

In step S19, in a state where the dispensation available punching head 11 is moved to the empty dispensing needle tip storing unit 103 in which the dispensing needle tip 13 has been stored or in a state where the dispensation available punching head 11 is not moved and positioned in the discarding unit, the dispensing needle tip 13 positioned below the forwarded arm plate 81 is moved up by using the ball screw 51 of the dispensing moving mechanism 15. This makes the dispensing needle tip 13 is caught and dropped from the dispensing nozzle 71 by the detaching notch 82b having the inner diameter smaller than the arrow feather part 34.

Subsequently, based on FIGS. 1 and 6, an operation is described in which the sample tube 6 is transferred to a hole provided in the conveyance body 106 to convey the sample tube 6 to a second position on the stage 100, for example, the other processing region 108 by the dispensation available punching head 11. The sample tube 6 is stored in the sample tube storing unit 105, that is, the first position on the stage 100, and the sample solution suctioned from the soft stopper sealed container 1 in step S15 is stored in the sample tube 6. The sample tube 6 has an opening part which can be fitted into the dispensing nozzle 71.

In step S'1, the punching tip 12 and the dispensing needle tip 13 are not attached to the dispensation available punching head 11 yet or are detached from the dispensation available punching head 11. The dispensation available punching head 11 is positioned above the sample tube 6 placed in the sample tube storing unit 105 on the stage 100 by the X-axis moving mechanism, the Y-axis moving mechanism 14Y, and the Z-axis moving mechanism 14Z. In addition, the Z-axis moving mechanism 14Z is controlled so as to descend the dispensation available punching head 11 until the position of the mounting hollow member 61 comes immediately above the sample tube 6.

In step S'2, the dispensing nozzle 71 is descended by rotating and driving the ball screw 51 as the dispensing moving mechanism 15 and reaches the mounting hollow member 61.

In step S'3, the sample tube 6 is attached to the dispensing nozzle 71 by further descending the dispensing nozzle 71 and squeezing the dispensing nozzle 71 into the opening part of the sample tube 6. The arm plate 81 is moved to the retreated position by the actuator 85.

In step S'4, the dispensation available punching head 11 is moved up by the Z-axis moving mechanism 14Z, and the dispensation available punching head 11 is positioned above the hole which can hold the tube 6 of the conveyance body 106 that is the second position by the X-axis moving mechanism and the Y-axis moving mechanism 14Y.

In step S'5, the dispensation available punching head 11 is descended by the Z-axis moving mechanism 14Z, and the arm plate 81 is moved forward by controlling the actuator 85. The detaching notch 82b of the arm plate 81 is engaged with the dispensation available punching head 11 on the upper side of the arrow feather part 7 and the flange provided on the upper side of the dispensing nozzle 71 attached below the bottom plate 11a or the sample tube 6.

In step S'6, by moving up the dispensing nozzle 71 by the ball screw 51, the sample tube 6 can be detached from the dispensing nozzle 71 by the arm plate 81.

In the above embodiment, since the arm member can be also used as the detaching member, the structure of the device can be simplified, and the cost to manufacture the device can be reduced.

FIGS. 7 to 13 are diagrams of a soft stopper penetrating dispensing device and a soft stopper penetrating dispensing method according to a second embodiment of the present invention.

FIG. 7 is a perspective view of a main part of a soft stopper penetrating dispensing device 210 according to the second embodiment of the present invention.

The soft stopper penetrating dispensing device 210 roughly includes a stage 300, a dispensation available punching head 211 which is relatively and movably provided relative to the stage 300, and a dispensation available punching head moving mechanism which can relatively move the dispensation available punching head 211 relative to the stage 300. On the stage 300, a liquid storing unit for storing various liquid and a tip storing unit for storing a tip are placed.

In the stage 300, a soft stopper sealed container 201, a tip storing unit 203, a cartridge container 302, a cartridge container 303, a temperature control block 304, a temperature controller for PCR 306, a cooling temperature control block 305, and an extracting dispensation tip 219 are provided. The soft stopper sealed container 201 is sealed with a soft stopper 202 made of a soft material and stores a sample therein. The tip storing unit 203 stores and holds a combination body 204 including the punching tip and the dispensing needle tip. The cartridge container 302 stores the extracting dispensation tip 219 to extract nucleic acid from the sample and a reagent including magnetic particles to extract the nucleic acid from the sample, and a reaction container is provided in the cartridge container 302. The cartridge container 303 amplifies the extracted nucleic acid. The temperature control block 304 controls the temperature of the reaction container provided in the cartridge container 302, and the temperature controller for PCR 306 controls the temperature for PCR regarding a container for PCR provided in the cartridge container 303.

Wells as ten liquid storing units are provided in the cartridge container 302, and two of them are reaction containers 302a and 302b of which the temperatures can be controlled by the temperature control block 304. The cartridge container 303 includes four reaction containers and a lid storing unit 307 for storing lids, and the cooling temperature control block 305 controls the temperatures of the three reaction containers 303a. After the PCR container is sealed by closing the lid, the temperature controller for PCR 306 controls the temperature of the PCR container to amplify the nucleic acid.

The dispensation available punching head moving mechanism can move the dispensation available punching head 211 only in the X-axis direction. The detail of the moving mechanism in the X-axis direction is, for example, the same as described in the first embodiment (the movement is limited to the X-axis direction). Therefore, the description is omitted. Regarding the Z-axis direction (vertical direction), a storing unit moving mechanism 214 (refer to FIGS. 11 to 13) can move the storing units in the vertical direction relative to the stage 300. According to this, before the punching tip 212 is attached to the mounting member 216 and the dispensing needle tip 213 is attached to the dispensing nozzle 271 or after the dispensing needle tip 213 is detached, the tip combination body 204 can be held, moved, and stored in the combined state. Therefore, the tip can be surely managed and stored, and cross contamination can be prevented. Also, the control can be easily performed, and processing with high reliability can be performed.

Also, a control unit (not shown) which controls at least the suction/discharge, the movement of the dispensation available punching head, a storing unit moving mechanism, a dispensing moving mechanism, and various temperature controllers is electrically connected to the dispensation available punching head 211, the storing unit moving mechanism 214, the temperature controllers 304, 305, and 306, the dispensation available punching head moving mechanism, and the like provided in the stage 300. The control unit includes a CPU, a memory, a program, a liquid crystal display, a keyboard, a mouse, a touch screen, an AD converter, a DA converter, and the like.

As illustrated in FIG. 8 in detail, the dispensation available punching head 211 includes a dispensing nozzle 271 which can suction and discharge the gas, a cylinder 272 which is communicated with the dispensing nozzle 271 and includes a plunger slidably provided therein, a rod 273 which has the plunger at its front end and vertically moves the plunger, a nozzle support 252, a motor 274 which rotates and drives a ball screw 276 to suction and discharge the gas by reciprocating the rod 273, a coupler 275 which couples a motor shaft of the motor 274 with the ball screw 276, the ball screw 276, a pressure sensor 278 which detects the pressure of the gas in the dispensing needle tip 213, and a nut part 277 which is screwed with the ball screw and reciprocates the rod 273. The nozzle support 252 movably supports the cylinder 272 and the dispensing nozzle 271 relative to the dispensation available punching head 211 in the vertical direction. Here, the dispensing nozzle 271, the cylinder 272, the rod 273, the motor 274, the coupler 275, the ball screw 276, and the nut part 277 correspond to a suction and discharge mechanism 217 and are supported by the nozzle support 252 and can be moved in the vertical direction.

The nozzle support 252 is guided by two guiding columns 251 which are provided in the dispensation available punching head 211 and are extended upward from the bottom plate 211a. The nozzle support 252 is provided so as to be movable in the vertical direction by a mechanism, which is not shown, using a motor, a timing belt, and a pulley. The nozzle support 252, the guiding columns 251, the motor, the timing belt, the pulley, and the like correspond to the dispensing moving mechanism 215.

The dispensing nozzle 271 is fitted into amounting opening provided on the upper side of a storage tube 233 which can store the liquid and is positioned above the dispensing needle tip 213 to be removably attached. A needle 231 of the tip lower part of the dispensing needle tip is provided so as to pass through the through-hole from the upper side of the punching tip 212.

The punching tip 212 includes a punching pipe 222 which has a through-hole along the vertical direction and is made of a hard material in a tapered shape and a supporting pipe 223 which is formed to be thicker than the punching pipe 222. A flange 226 to removably attach the punching tip 212 to the dispensation available punching head 211 is provided along the outer periphery of the supporting pipe 223 of the punching tip 212. In the supporting pipe 223, the storage tube 233 as the tip upper part of the dispensing needle tip 213 is provided in a state where the needle 231 which is the tip lower part of the dispensing needle tip 213 can be stored to be able to be inserted into the through-hole.

The mounting member 216 is provided on the upper side of the bottom plate 211a of the dispensation available punching head 211, and the arm member 218 is provided on the lower side of the bottom plate 211a. In the mounting member 216, holding units 261 and 262 for holding the flange 226 of the supporting pipe 223 of the punching tip 212 by vertically and/or horizontally sandwiching it are provided to be slidable along the X-axis direction. The arm member 218 includes a plate-like tip detaching member 281 which can be moved forward and backward relative to the dispensing nozzle 271 along the X-axis direction and a magnet 282. The tip detaching member 281 can detach the dispensing needle tip 213 attached to the dispensing nozzle 271 and the extracting dispensation tip 219 from the dispensing nozzle 271 by moving close to the dispensing nozzle 271 and moving up the dispensing nozzle 271 by the dispensing moving mechanism 215. Therefore, the tip detaching member 281 is a plate-like member having a semicircular or horseshoe-shaped notch of which the inner diameter is larger than the outer shape of the dispensing nozzle 271 and is smaller than the outer diameters of the storage tube 233 of the dispensing needle tip 213 attached to the dispensing nozzle 271 and a thick tube 292 of the extracting dispensation tip 219. Also, by moving close to the thin tube 291 of the extracting dispensation tip 219, the magnet 282 gives a magnetic field in the thin tube 291 and can make the magnetic particles be adsorbed to the inner wall of the thin tube 291.

The tip storing unit 203 is provided on the stage 300. The tip storing unit 203 can hold the tip combination body 204 (refer to FIGS. 9(a) to 9(f)) in which the punching tip 212 and the dispensing needle tip 213 are combined in a state where the supporting pipe 223 of the punching tip 212 holds the storage tube 233 of the dispensing needle tip 213 and in a state where the needle 231 of the tip lower part of the dispensing needle tip 213 is inserted into the through-hole of the punching pipe 222 of the punching tip 212.

The tip storing unit 203 is provided to be movable in the vertical direction relative to the stage 300 by the storing unit moving mechanism 214 (refer to FIGS. 11 to 13). The storing unit moving mechanism 214 includes rack gears 241 and 242 which can move in the vertical direction and a pinion gear 243 which is engaged with the rack gears 241 and 242 and is rotated and driven by a motor which is not shown. The tip storing unit 203 is attached to the rack gear 241, and the soft stopper sealed container 201 is attached to the rack gear 242. Therefore, when the tip storing unit 203 is moved up by the storing unit moving mechanism 214, the soft stopper sealed container 201 descends by almost the same distance. According to this, the storage unit which does not perform processing is prevented from moving close to the dispensation available punching head 211.

FIGS. 9(a) to 9(f) are detailed cross sectional diagrams of the soft stopper sealed container 201, the tip storing unit 203, the punching tip 212, the dispensing needle tip 213, the dispensation tip 219, and the tip combination body 204 according to the present invention.

FIG. 9(a) is a cross sectional diagram of the soft stopper sealed container 201. The soft stopper sealed container 201 is a tube sealed with the soft stopper 202 of which the upper part is made of a soft material. A recess 202a is provided on the upper side of the soft stopper 202, and the thickness of the soft stopper 202 is made to be thin. This makes the punching tip 212 easily bore the soft stopper 202, and diffusion of the sample solution, which may leak out through the bored hole, to the outside can be prevented.

FIG. 9(b) is a diagram of the tip storing unit 203 which can hold the tip combination body 204. The tip storing unit 203 includes a thin tube part 203a which is formed in a slightly tapered shape and a thick tube part 203b which is formed to be thicker than the thin tube part 203a. A step 203c is provided at the boundary between the thin tube part 203a and the thick tube part 203b. A gap for holding 203d is provided in the thin tube part 203a so that the mounting member 216 can hold the flange 226 of the punching tip 212 of the combination body 204 which is stored and held.

FIG. 9(c) is a cross sectional diagram of the punching tip 212. The punching tip 212 includes the punching pipe 222, the supporting pipe 223 which communicates with the punching pipe 222 and is formed to be thicker than the punching pipe 222, and a transfer part 224 which is provided between the punching pipe 222 and the supporting pipe 223 so as to communicate with them. The through-hole 221 is provided in the punching pipe 222 in the vertical direction, and the punching pipe 222 is made of a hard material and formed in a tapered shape to the front end by being obliquely cut. Two flanges 226 and 225 are provided on the supporting pipe 223. The upper flange 226 can be held by the holding units 261 and 262 of the mounting member 216, and the lower flange 225 can be engaged with the step 203c of the tip storing unit 203. A step 227 is provided in the upper part of the supporting pipe 223. The storage tube 233 of the tip upper part of the dispensing needle tip 213 is provided in the supporting pipe 223 in a state where the storage tube 233 can be held, stored, and loosely inserted in the supporting pipe 223.

FIG. 9(d) is a cross sectional diagram of the dispensing needle tip 213. The dispensing needle tip 213 includes the storage tube 233 which can store the liquid therein as the tip upper part, the needle 231 which is formed to be thinner than the storage tube 233, and the transfer part 232 formed between the storage tube 233 and the needle 231. The thickness and shape of the needle 231 are formed to be capable of passing through the through-hole provided in the punching tip 212. A plurality of projections 234 along the vertical direction are provided on the outer periphery of the storage tube 233. When the storage tube 233 is stored, held, and loosely inserted in the supporting pipe 223, the projections 234 can be engaged with the step 227 formed in the supporting pipe 223. The dispensing needle tip 213 and the punching tip 212 are combined with each other and form the tip combination body 204. In consideration of hardness and the size of the diameter, it is preferable that the materials of the dispensing needle tip 213 and the punching tip 212 be metal and alloy.

FIG. 9 (e) is a diagram of the dispensation tip 219. The dispensation tip 219 includes the thin tube 291 which has a mouth part 294, the thick tube 292 which is formed to be thicker than the thin tube 291 and has a mounting opening 295 to which the dispensing nozzle 271 can be removably attached, and the transfer part 293 which communicates the thin tube 291 with the thick tube 292. The liquid can flow in/out from the front end of the mouth part 294 of the thin tube 291.

FIG. 9(f) includes a top view, a plan view, and a side view of the combined tip combination body 204 stored in the tip storing unit 203. The tip combination body 204 is combined in a state where the needle 231 of the tip lower part of the dispensing needle tip 213 is inserted into the through-hole of the punching tip 212 and in a state where the storage tube 233 of the tip upper part of the dispensing needle tip 213 is stored, held, and loosely inserted in the supporting pipe 223.

FIG. 10 is a side view of the soft stopper penetrating dispensing device 210 in a state where the tip combination body 204 is stored in the tip storing unit 203. The dispensing needle tip 213 is detached from the dispensing nozzle 271, and the punching tip 212 is detached from the mounting member 216. Then, both of them are combined with each other and stored and held in the tip storing unit 203 provided on the stage 300 as the tip combination body 204.

Subsequently, based on FIGS. 11 to 13, the soft stopper penetrating dispensing device 210 and the operation of the soft stopper penetrating dispensing method according to the second embodiment of the present invention are described.

As illustrated in FIG. 11, in step S101, the dispensation available punching head 211 is moved in the X-axis direction, and the dispensing nozzle 271 is positioned above the tip storing unit 203 for storing the tip combination body 204. The tip storing unit 203 is provided in the rack gear 241 which can be moved in the vertical direction as the storing unit moving mechanism 214 provided on the stage 300, and the rack gear 241 is engaged with the pinion gear 243 rotated and driven by a motor which is not shown. On the other hand, the soft stopper sealed container 201 is attached to the rack gear 242 and is engaged with the pinion gear 243.

In step S102, the tip storing unit 203 is moved up by rotating and driving the pinion gear 243 of the storing unit moving mechanism 214 in a counterclockwise direction in the figure, and at the same time, the soft stopper sealed container 201 is descended. Accordingly, the tip combination body 204 stored and held by the tip storing unit 203 is moved up. Then, the flange 226 provided in the supporting pipe 223 of the punching tip 212 of the tip combination body 204 is held by and attached to the holding units 261 and 262 of the mounting member 216. Next, the dispensing nozzle 271 is descended by the dispensing moving mechanism 215 provided in the dispensation available punching head 211 and is fitted into the mounting opening of the storage tube 233 of the dispensing needle tip 213 which is held, stored, or loosely inserted in the supporting pipe 223 of the punching tip 212. Then, the dispensing needle tip 213 is attached to the dispensing nozzle 271.

In step S103, the tip storing unit 203 attached to the rack gear 241 is descended by rotating and driving the pinion gear 243 of the storing unit moving mechanism 214 in a clockwise direction in the figure, and at the same time, the soft stopper sealed container 201 attached to the rack gear 242 is moved up. Since the punching tip 212 is attached to the mounting member 216, in a state where the punching tip 212 is left above the tip storing unit 203 as storing and holding the dispensing needle tip 213 by moving the tip storing unit 203 downward, the tip storing unit 203 is returned to the original position in the stage 300. The dispensing needle tip 213 is moved up relative to the punching tip 212 by the dispensing moving mechanism 215, and the front end of the dispensing needle tip 213 is positioned in the punching pipe 222 of the punching tip 212. Then, the punching tip 212 and the dispensing needle tip 213 are positioned above the stage 300.

In step S104, the dispensation available punching head 211 is moved in the X-axis direction relative to the stage 300, and the punching tip 212 and the dispensing needle tip 213 are positioned above the soft stopper sealed container 201.

In step S105, the soft stopper sealed container 201 is moved up by rotating and driving the pinion gear 243 of the storing unit moving mechanism 214 in the clockwise direction, and at the same time, the tip storing unit 203 is descended. Accordingly, the punching pipe 222 of the punching tip 212 is stuck to the soft stopper 202 of the soft stopper sealed container 201 and bores the soft stopper 202 until the punching pipe 222 passes through the soft stopper 202.

In step S106, the needle 231 of the dispensing needle tip 213 is descended by the dispensing moving mechanism 215 through the through-hole of the punching pipe 222 of the punching tip 212 and is inserted into the soft stopper sealed container 201. The sample solution stored in the soft stopper sealed container 201 is suctioned and stored in the storage tube 233 of the dispensing needle tip 213 by using the suction and discharge mechanism 217. At this time, the liquid level of the sample solution in the soft stopper sealed container 201 is detected by detecting the pressure of the gas in the dispensing needle tip 213 by the pressure sensor 278 and detecting a rapid change of the pressure. The front end of the dispensing needle tip 213 is descended to the predetermined depth from the liquid level by the dispensing moving mechanism 215, and a predetermined amount of the liquid corresponding to the depth is suctioned. According to the present embodiment, since the inside of the soft stopper sealed container 201 communicates with the air through the gap made between the punching pipe 222 and the needle 231 of the dispensing needle tip 213 by the punching tip 212, the liquid level is detected with high reliability. Therefore, processing can be performed with high quantitativity.

The procedure proceeds to FIG. 12. In step S107, the dispensing needle tip 213 is moved up by the dispensing moving mechanism 215, and the front end of the needle 231 is positioned in the punching pipe 222 of the punching tip 212. Therefore, the combination body 204 formed of the dispensing needle tip 213 and the punching tip 212 is positioned above the stage 300.

In step S108, by moving the dispensation available punching head 211 on the stage 300 along the X-axis direction, the dispensation available punching head 211 is positioned above a first well of the cartridge container 302. The sample solution is discharged into the well by descending the needle 231 of the dispensing needle tip 213 by the dispensing moving mechanism 215 and inserting the needle 231 into the well.

In step S109, the dispensation available punching head 211 is moved in the X-axis direction and is returned to a place above the tip storing unit 203.

In step S110, after the tip storing unit 203 is moved up by rotating and driving the pinion gear 243 of the storing unit moving mechanism 214 in the counterclockwise direction in the figure and the tip combination body 204 is stored and held, the punching tip 212 is released by sliding the mounting member 216 in the X-axis direction.

In step S111, the tip storing unit 203 is descended by driving the pinion gear 243 of the storing unit moving mechanism 214 in the clockwise direction in the figure and is placed to the original position in the stage 300. Next, after the tip detaching member 281 is moved close to the moving path of the dispensing nozzle 271, the dispensing nozzle 271 is moved up by the dispensing moving mechanism 215. Accordingly, the dispensing needle tip 213 is detached from the dispensing nozzle 271 and is stored in the tip storing unit 203 as the tip combination body 204.

The procedure proceeds to FIG. 13. In step S112, the dispensation available punching head 211 is moved in the X-axis direction and is positioned above the dispensation tip 219. By descending the dispensing nozzle 271, the dispensing nozzle 271 is fitted into and attached to the mounting opening 295 of the dispensation tip 219, and the mouth part 294 of the dispensation tip 219 is positioned above the stage 200 by moving up the dispensing nozzle 271.

In step S113, the dispensation available punching head 211 is moved in the X-axis direction and is positioned above the first well of the cartridge container 302. The mouth part 294 of the dispensation tip 219 is inserted into the well by descending the dispensing nozzle 271 by the dispensing moving mechanism 215, and the sample and magnetic particle suspension stored in the well are mixed by repeating the suction and discharge by the suction and discharge mechanism 217. The mixed liquid is suctioned again, and the dispensation tip 219 is moved up. Then, the dispensation available punching head 211 is moved in the X-axis direction and is positioned above the next well. Similarly, the reagent necessary for extracting the nucleic acid in the sample is mixed, and the processing is performed to the cartridge container 302. Then, the magnetic particle suspension is discharged in the reaction container and is mixed with dissociated solution, and the temperature is controlled. In this way, the extracted nucleic acid is separated from the magnetic particle into the solution, and the power of the magnet 282 is applied in the thin tube 291 of the dispensation tip 219. The magnetic particles are adsorbed to the inner wall of the thin tube 291, and the magnetic particles are moved to another well. Then, the magnetic particles are fallen in the well by repeating the suction and discharge in a state where the magnet 282 is kept away. The residual liquid in the well is suctioned by the dispensation tip 219, and the dispensation available punching head 211 is moved in the X-axis direction and is transferred and discharged to the reaction container of the cartridge container 302. Then, the residual liquid is mixed with other reagent, and reaction processing is performed.

According to the soft stopper penetrating dispensing device and the soft stopper penetrating dispensing method according to the second embodiment of the present invention, the punching tip 212 and the dispensing needle tip 213 which are concurrently used relative to the soft stopper sealed container are combined as the tip combination body 204 and can be stored, held, and used in the tip storing unit in a combined state. Therefore, management and control can be easily performed, and the cross contamination can be surely prevented. The processing can be performed with high reliability.

The embodiments described above are specific description for easy understanding of the present invention and do not limit the other embodiment. Therefore, the embodiments can be changed without changing the scope of the invention. For example, it is preferable that the embodiment have the punching tip and the dispensing needle tip which can be independently moved in the vertical direction. Also, it is preferable that the container side of the gripping plate of the holding member be processed to have a curved surface which can closely contact the outer surface of the container. Also, partition plates projected from gripping plates on both sides are included, and each partition plate is integrated with each gripping plate in a substantially semicircular shape. Both gripping plates sandwich each container so as to surround it, and the partition plates may hold the container by being coupled with each other.

In the above, a case has been described where a single pair of the punching tip and the dispensing needle tip is provided in the dispensation available punching head. However, the number of the pairs is not limited to one. The processing can be performed in parallel by using a plurality of pairs of the punching tip and the dispensing needle tip.

Also, the devices, the component for forming the devices, and the parts for forming the components described in the embodiments of the present invention can be appropriately selected, changed, and combined with each other. The devices, the components, and the parts include, for example, the dispensing needle tip, the punching tip, the dispensation available punching head, the dispensing nozzle, the supporting pipe, the storage unit, the soft stopper sealed container, the overturning stirrer, the mounting member, the arm member, the cartridge container, and the soft stopper penetrating dispensing device. For example, in the above description, a case has been described where the ball screw is used as the dispensing moving mechanism. However, other mechanism such as the timing belt can be similarly used. Spatial expressions in the present application such as "upward", "downward", "inside", "outside", "X-axis", "Y-axis", and "Z-axis" are used only for illustration. The spatial expressions above do not limit specific spatial direction or arrangement of the structure.

INDUSTRIAL APPLICABILITY

The present invention relates to a soft stopper penetrating dispensing device and a soft stopper penetrating dispensing method. The present invention relates to various fields such as a field requiring to handle biological polymers and biological low molecules such as genes, immune systems, amino acids, protein, and sugars, for example, the industrial field, the agricultural field such as foods, agricultural products, and seafood processing, the pharmaceutical field, the medical field such as hygiene, health, immunity, diseases, and transmission, the science field such as chemistry or biology. Especially, the present invention is effective in a case where a series of processing for using a number of reagents and substances is continuously performed in a predetermined order.

REFERENCE SIGNS LIST 1, 201 soft stopper sealed container
2, 202 soft stopper
204 tip combination body
6 sample tube
10, 210 soft stopper penetrating dispensing device
11, 211 dispensation available punching head
12, 212 punching tip
13, 213 dispensing needle tip
14(214) dispensation available punching head moving mechanism (storing unit moving mechanism)
15(215) dispensing moving mechanism
16, 216 mounting member
17(217) dispensing support part (suction and discharge mechanism)
18, 218 arm member (also used as detaching member)
219 dispensation tip
21, 221 through-hole
22, 222 punching pipe
23(223) fitting pipe (supporting pipe)
31(231) tip lower part (needle)
33(233) tip upper part (storage tube)
51 ball screw (dispensing moving mechanism)
61(216) mounting hollow member (mounting member)
71, 271 dispensing nozzle
73, 273 dispensing nozzle support
278 pressure sensor
81(218) arm plate (arm member, detaching member)
100, 300 stage
101 overturning stirrer

The invention claimed is:

1. A soft stopper penetrating and dispensing device for penetrating a soft stopper having an elastic body constructed of soft material, the device comprising:
    a stage having at least one container storing a liquid and having an opening sealed with a soft stopper having an elastic body constructed of soft material;
    a dispensation available punching head having a dispensing moving mechanism configured for moving the dispensation available punching head relative to the stage and a mounting member;
    a dispensing nozzle attached to die dispensation available punching head and movable relative to the stage;
    a punching tip detachably attached to the dispensation available punching head via the mounting member and located vertically below the dispensing nozzle on the dispensation available punching head, the punching tip having a through-hole along a vertical direction; and
    a dispensing needle tip detachably attached to the dispensing nozzle and independently vertically movable relative to the punching tip and the stage along a moving path, the dispensing needle tip including a tip upper part defining a storage tube for suction and discharge of the liquid and including a lower part insertable into the through-hole of the punching tip from an upper side of the punching tip, the dispensing needle tip further including a mounting opening in the tip upper part attached to the dispensing nozzle and a transfer part or attachment to the punching tip;
    wherein the dispensing moving mechanism is configured to move the dispensing nozzle vertically downwardly such that the transfer part of the dispensing needle tip engages the punching tip and the lower part of the dispensing needle tip extends through the through-hole of the punching tip;
    wherein the dispensing moving mechanism is configured to move the punching tip to engage the soft stopper of the at least one container on the stage such that the punching tip penetrates the soft stopper; and
    wherein the dispensation available punching head has a detaching member configured for detaching the dispensing needle tip from the dispensing nozzle by partially blocking a moving path of the dispensing needle tip adjacent the tip upper part when the dispensing moving mechanism moves the dispensing nozzle vertically upwardly.

2. The soft stopper penetrating and dispensing device according to claim 1, further comprising: a pressure sensor configured to detect a pressure of gas in the dispensing needle tip.

3. The soft stopper penetrating and dispensing device according to claim 1, wherein an upper part of the punching tip is detachably attached to the mounting member of the dispensation available punching head.

4. The soft stopper penetrating and dispensing device according to claim 3,
    wherein the dispensation available punching head includes an arm member which is movable forward and backward in the horizontal direction relative to the punching tip to detach the dispensing needle tip from the dispensing nozzle.

5. The soft stopper penetrating and dispensing device according to claim 1, wherein the stage has an overturning stirrer including a holding member that holds the at least one container sealed with the soft stopper in a standing state, the stage also having a rotation driving unit that rotates and drives the holding member so as to overturn the at least one container when held by tire holding member.

6. The soft stopper penetrating and dispensing device according to claim 1, wherein the stage has a sample tube placed thereon, the sample tube having an opening part, wherein the sample tube is detachably attachable to the dispensing nozzle of the dispensation available punching head at the opening part such that the sample tube moves with the dispensing nozzle, and the sample tube is removed from the dispensing nozzle using the detaching member when the dispensing moving mechanism moves the dispensing nozzle vertically upwardly to contact the detaching member.

7. The soft stopper penetrating dispensing and device according to claim 1, wherein the dispensing moving mechanism is configured to lower the dispensing needle tip relative to the punching tip to detach the punching tip from the mounting member.

8. The soft stopper penetrating and dispensing device of claim 1, wherein the dispensing moving mechanism comprises an x-axis moving mechanism, a y-axis moving mechanism and a z-axis moving mechanism.

9. The soft stopper penetrating and dispensing device according to claim 8, further comprises a suction and discharge mechanism; wherein
   the dispensing moving mechanism is configured to position the dispensation available punching head above at least one container sealed with a soft stopper on the stage using the x-axis moving mechanism and the y-axis moving mechanism and
   bore the soft stopper of the at least one container with the punching tip by descending the punching tip by downwardly moving the dispensation available punching head using the z-axis moving mechanism;
   when the dispensing moving mechanism subsequently moves the dispensing needle tip into the punching tip, and
   after boring the soft stopper with the punching tip, the suction and discharge mechanism is configured to suction and discharge the liquid when the lower part of the dispensing needle tip moves through the through-hole and the soft stopper and into the at least one sealed container.

10. The soft stopper penetrating and dispensing device according to claim 9, further comprising a storing unit moving mechanism configured to raise the at least one container such that the lower part of the dispensing needle tip moves into the through-hole of the punching tip while the dispensing moving mechanism is configured to simultaneously lower the punching tip and the dispensing needle tip to bore the soft stopper with the punching tip.

11. A dispensing method, the method comprising:
   providing a stage, a sample tube on the stage, and a first sealed container at a first position on the stage; the first sealed container storing a liquid and including an opening that is sealed with an elastic stopper;
   positioning a punching tip attached to a mounting member above the stage with the mounting member connected to a dispensation available punching head having a dispensing nozzle and driven by a dispensing moving mechanism that moves the dispensation available punching head along an x-axis, a y-axis, and a z-axis, the punching tip having a tapered shape and a through-hole along a vertical direction and a dispensing needle tip being detachably attached to the dispensing nozzle and having a tip upper part defining a storage tube for suction and discharge of the liquid and including a tip lower part insertable into the through-hole of the punching tip from an upper side of the punching tip, the dispensing needle tip further including a mounting opening in the upper part of the dispensing needle tip attached to the dispensing nozzle;
   before the positioning step, detachably attaching the dispensing needle tip to the dispensing nozzle with the dispensing moving mechanism connected to the dispensation available punching head driven by the dispensing moving mechanism;
   boring the elastic stopper of the first sealed container with the punching tip by lowering the punching tip relative to the stage;
   lowering the dispensing needle tip into the through-hole of the punching tip such that the lower part of the dispensing needle tip extends through the through-hole and the stopper so that the lower part of the dispensing needle enters the first sealed container;
   activating a suction and discharge mechanism and suctioning the liquid into the dispensing needle tip;
   removing the dispensing needle tip and the punching tip from the first sealed container by raising the dispensation available punching head using the dispensing moving mechanism; and
   discharging the liquid from the dispensing needle tip into a sample tube using the suction and discharge mechanism.

12. The dispensing method according to claim 11, further comprising:
   detaching the dispensing needle tip from the dispensing nozzle using a detaching member by at least partially blocking an upward movement path of the attached dispensing needle tip with the detaching member and moving the dispensing nozzle upward using the dispensing moving mechanism after the of discharging the liquid.

13. The dispensing method according to claim 11,
   wherein the boring step includes inserting the dispensing needle tip into the through-hole by lowering the dispensing needle tip using the dispensing moving mechanism such that the dispensing needle tip connects to the punching tip, and lowering the dispensing needle tip and the punching tip together until the punching tip bores the stopper of the first sealed container, and
   wherein the suctioning step includes suctioning the liquid using the dispensing needle tip inserted into the through-hole by further lowering the dispensing needle tip through the through-hole and into the first sealed container using the dispensing moving mechanism.

14. The dispensing method according to claim 11, further comprising:
   stirring the first sealed container by overturning the first sealed container using an overturning stirrer prior to the step of boring the first sealed container and returning the first sealed container to the first position.

15. The dispensing method according to claim 11, further comprising prior to the step of positioning a punching tip:
   positioning the dispensation available punching head above the sample tube placed at a first position on the stage;
   detachably attaching the sample tube to the dispensing nozzle by lowering the dispensing nozzle relative to the stage using the dispensation available punching head;
   placing the sample tube at a second position on the stage by relatively moving the dispensation available punching head relative to the stage; and detaching the sample tube from the dispensing nozzle by raising the dispensing nozzle upward relative to a detaching member slidably attached to the dispensing moving mechanism using the dispensing moving mechanism the detaching member at least partially blocking an upward moving path of the attached sample tube such that the sample tube is in place by the detaching member while the dispensing nozzle moves upwardly.

16. The method of claim 15 wherein the discharging step comprises dispensing a sample into the sample tube placed at the second position on the stage.

* * * * *

UNITED STATES PATENT AND TRADEMARK OFFICE
CERTIFICATE OF CORRECTION

PATENT NO.       : 10,625,255 B2
APPLICATION NO.  : 15/111709
DATED            : April 21, 2020
INVENTOR(S)      : Hideji Tajima Page 1 of 1

It is certified that error appears in the above-identified patent and that said Letters Patent is hereby corrected as shown below:

In the Claims

Column 30, Line 12-13 of Claim 1:
"...a dispensing nozzle attached to die dispensation available punching head and movable relative to the stage..."
Should instead read:
-- ...a dispensing nozzle attached to the dispensation available punching head and movable relative to the stage... --

Column 30, Lines 26-29 of Claim 1:
"...the dispensing needle tip further including a mounting opening in the tip upper part attached to the dispensing nozzle and a transfer part or attachment to the punching tip..."
Should instead read:
-- ...the dispensing needle tip further including a mounting opening in the tip upper part attached to the dispensing nozzle and a transfer part for attachment to the punching tip... --

Column 31, Lines 1-2 of Claim 5:
"...drives the holding member so as to overturn the at least one container when held by tire holding member."
Should instead read:
-- ...drives the holding member so as to overturn the at least one container when held by the tire holding member. --

Column 32, Lines 34-36 of Claim 12:
"...moving the dispensing nozzle upward using the dispensing moving mechanism after the of discharging the liquid."
Should instead read:
-- ...moving the dispensing nozzle upward using the dispensing moving mechanism after the step of discharging the liquid. --

Signed and Sealed this
Sixth Day of October, 2020

Andrei Iancu
*Director of the United States Patent and Trademark Office*